(12) United States Patent
Yamakawa et al.

(10) Patent No.: US 9,318,258 B2
(45) Date of Patent: Apr. 19, 2016

(54) ANTENNA COIL COMPRISING PLURALITY OF COIL PORTIONS

(71) Applicant: EQUOS RESEARCH CO., LTD., Tokyo (JP)

(72) Inventors: Hiroyuki Yamakawa, Tokyo (JP); Kenichirou Satou, Tokyo (JP)

(73) Assignee: EQUOS RESEARCH CO., LTD., Tokyo (JP)

( * ) Notice: Subject to any disclaimer, the term of this patent is extended or adjusted under 35 U.S.C. 154(b) by 0 days.

(21) Appl. No.: 14/401,393

(22) PCT Filed: May 14, 2013

(86) PCT No.: PCT/JP2013/063406
§ 371 (c)(1),
(2) Date: Nov. 14, 2014

(87) PCT Pub. No.: WO2013/172336
PCT Pub. Date: Nov. 21, 2013

(65) Prior Publication Data
US 2015/0137612 A1 May 21, 2015

(30) Foreign Application Priority Data

May 17, 2012 (JP) .................................. 2012-113810

(51) Int. Cl.
*H01F 38/14* (2006.01)
*H01Q 7/08* (2006.01)
(Continued)

(52) U.S. Cl.
CPC ............ *H01F 38/14* (2013.01); *B60L 11/1829* (2013.01); *H01Q 7/00* (2013.01); *H01Q 7/08* (2013.01); *H02J 17/00* (2013.01); *H02J 7/025* (2013.01); *Y02T 10/7005* (2013.01); *Y02T 90/12* (2013.01); *Y02T 90/121* (2013.01);
(Continued)

(58) Field of Classification Search
None
See application file for complete search history.

(56) References Cited

U.S. PATENT DOCUMENTS 6,803,744 B1 * 10/2004 Sabo .............................. 320/108
7,450,910 B2 * 11/2008 Aoki ............................... 455/69
(Continued)

FOREIGN PATENT DOCUMENTS

EP 1689029 A1 8/2006
EP 1976055 A1 10/2008
(Continued)

OTHER PUBLICATIONS

Aug. 13, 2013 Written Opinion issued in International Application No. PCT/JP2013-063406 (with English translation).
(Continued)

*Primary Examiner* — Rexford Barnie
*Assistant Examiner* — David Shiao
(74) *Attorney, Agent, or Firm* — Oliff PLC

(57) ABSTRACT

Provided is an antenna coil capable of forming a magnetic field in a desired direction in an efficient manner, while suppressing leakage of magnetic flux into a space other than the space in which the magnetic field is formed. The antenna coil includes a main coil portion formed by winding a length of conductor wire around a first reference axis and an auxiliary coil portion formed by winding the conductor wire around a second reference axis. The second reference axis is set to intersect the magnetic flux of the main coil portion at an axial end of the auxiliary coil portion. The main coil portion and the auxiliary coil portion are connected to together form a closed circuit.

20 Claims, 13 Drawing Sheets

(51) Int. Cl.
   *B60L 11/18* (2006.01)
   *H02J 17/00* (2006.01)
   *H01Q 7/00* (2006.01)
   *H02J 7/02* (2006.01)

(52) U.S. Cl.
   CPC ............ *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 7,714,537 B2 * | 5/2010 | Cheng et al. | 320/108 |
| 8,297,516 B2 | 10/2012 | Fukushima et al. | |
| 8,422,973 B2 * | 4/2013 | Takarada | H01Q 7/00 340/572.1 |
| 8,587,154 B2 * | 11/2013 | Fells et al. | 307/104 |
| 8,847,434 B2 * | 9/2014 | Hennig | A61B 5/0031 307/104 |
| 9,124,126 B2 * | 9/2015 | Ichikawa | B60L 11/182 |
| 2005/0122059 A1 * | 6/2005 | Baarman et al. | 315/244 |
| 2007/0024516 A1 | 2/2007 | Araki et al. | |
| 2008/0238799 A1 | 10/2008 | Tsushima | |
| 2010/0259217 A1 * | 10/2010 | Baarman et al. | 320/108 |
| 2011/0089768 A1 | 4/2011 | Byrne et al. | |
| 2011/0169337 A1 * | 7/2011 | Kozakai | 307/104 |
| 2012/0081257 A1 | 4/2012 | Yosui et al. | |
| 2012/0119698 A1 * | 5/2012 | Karalis et al. | 320/108 |
| 2012/0146580 A1 * | 6/2012 | Kitamura | 320/108 |
| 2012/0248893 A1 * | 10/2012 | Teggatz et al. | 307/104 |
| 2013/0038281 A1 * | 2/2013 | Sakakibara et al. | 320/108 |
| 2013/0093253 A1 * | 4/2013 | Norconk et al. | 307/104 |
| 2013/0181876 A1 * | 7/2013 | Miura | G06K 7/10316 343/788 |
| 2014/0284159 A1 * | 9/2014 | Boys | H01F 38/14 191/2 |
| 2015/0145343 A1 * | 5/2015 | Chiyo | H01F 27/38 307/104 |
| 2015/0180285 A1 * | 6/2015 | Yamakawa | B60L 11/182 307/104 |

FOREIGN PATENT DOCUMENTS

| | | |
|---|---|---|
| EP | 2120290 A1 | 11/2009 |
| JP | A-H11-122146 | 4/1999 |
| JP | 2003/016409 A | 1/2003 |
| JP | A-2008-244575 | 10/2008 |
| JP | 2009-147560 A | 7/2009 |
| JP | A-2011-142559 | 7/2011 |
| JP | A-2011-234496 | 11/2011 |
| JP | 2013-207238 A | 10/2013 |
| JP | A-2013-207727 | 10/2013 |

OTHER PUBLICATIONS

May 6, 2015 Extended Search Report issued in European Patent Application No. 13790341.5.
May 26, 2015 Office Action issued in Chinese Patent Application No. 201380025461.8.
Feb. 2, 2016 Office Action issued in Japanese Patent Application No. 2012-113810.

* cited by examiner

ANTENNA COIL COMPRISING PLURALITY OF COIL PORTIONS

TECHNICAL FIELD

The present invention relates to an antenna coil for use in wireless transmission.

BACKGROUND ART

In recent years, there has been a growing interest in a technique of supplying electric power in a wireless manner without using a cable, that is, in a contactless manner, to an electric instrument or an electric device movable without being fixedly positioned, such as a mobile phone, a personal digital assistance (PDA), an electrically assisted bicycle, an electric vehicle, a hybrid automobile, etc. For instance, Japanese Unexamined Patent Application Publication No. 2011-234496 (Patent Document 1) discloses a technique for contactless power supply to a vehicle from a power source disposed outside the vehicle. Also, Japanese Unexamined Patent Application Publication No. 2008-244575 (Patent Document 2) discloses a technique relating to an antenna coil for short-distance wireless communication.

In this way, in a coil unit including a resonance coil (antenna coil) incorporated in a resonance circuit to function as an antenna, in order to suppress adverse influence of magnetic field generated in its circumference to other devices or to provide the antenna with a desired directivity for transmission/reception, it is generally implemented to provide a shield on the side for shielding the magnetic field. However, disposing a shield can sometimes be undesirable if disposing space or cost needs to be taken into consideration.

The shield-less coil unit disclosed in Patent Document 1 includes a plurality of resonance coils and these coils are disposed such that the magnetic field generated in one resonance coil and the magnetic field generated in at least one other resonance coil are in opposite phases. With this arrangement, the magnetic fields in the other location than the resonance circuits may be cancelled out each other, thereby to reduce leakage magnetic field (Patent Document 1: paragraphs 5-12, FIG. 1, FIG. 2, etc.). However, with such cancellation of magnetic fields, there occurs reduction in the strength of the magnetic field for a same amount of power supplied to the power supplying side resonance coil, so that reduction in power supply efficiency too occurs.

Further, in the case of the antenna coil for short-distance wireless communication disclosed in Patent Document 2, instead of a plate-like shield, the coil employs, as a shield, a loop coil provided separately from a resonance oil acting as an antenna. And, this loop coil is disposed at a position interlinked with the non-communication direction side components of the magnetic flux generated by the resonance coil acting as the antenna. As a result, the antenna coil can be switched over between a state having high directivity and a state having weak directivity for allowing communication over a wider area, by switching over between a state when a loop of the loop coil is formed and a state when the loop is disconnected (Patent Document 2: paragraphs 31, 48-50, etc.). With addition of a shield in the form of a plate-like shield or a loop coil, the directivity on the side where the shield is present is restricted, so that the directivity on the side where the shield is absent can be enhanced relatively. However, the addition of shield may lead to wasteful consumption of energy and deterioration in transmission efficiency.

Patent Document 1: Japanese Unexamined Patent Application Publication No. 2011-234496

Patent Document 2: Japanese Unexamined Patent Application Publication No. 2008-244575

SUMMARY OF THE INVENTION

With view to the background of the art described above, it will be useful to provide an antenna coil for use in e.g. contactless electric power transmission, capable of highly efficient power supply with suppression of magnetic flux leakage into a space other than the space in which the magnetic field linking the power supplying side resonance circuit and the power receiving side resonance circuit is formed. And, an antenna coil having high transmission efficiency with effective suppression of magnetic flux leakage into a space other than transmission space, in other types of wireless transmission will be useful also.

In view of the above-stated object, there is a need for an antenna coil capable of forming a magnetic field in a desired direction in an efficient manner, while suppressing leakage of magnetic flux into a space other than the space in which the magnetic field is formed.

According to a characterizing feature of an antenna coil in view of the above-stated object, the inventive coil includes a main coil portion formed by winding a length of conductor wire around a first reference axis and an auxiliary coil portion formed by winding a length of conductor wire around a second reference axis, wherein the second reference axis is set to intersect the magnetic flux of the main coil portion at an axial end of the auxiliary coil portion; and the main coil portion and the auxiliary coil portion together form a closed circuit. Incidentally, the first reference axis and the second reference axis are not limited straight lines, but can respectively be a variety of forms such as a combination of multiple straight lines, a combination of multiple straight lines and a curved line interconnecting them, curved lines formed of partial arcs, etc.

With the above-described arrangement, due to the auxiliary coil portion, the magnetic flux forming the magnetic field around the main coil portion are affected and changed by the influence from the magnetic field generated by the auxiliary coil portion, in comparison with an arrangement devoid of such auxiliary coil portion. With this, between the side of the presence of the auxiliary coil portion and the side of the absence of the same, the spreading areas of the magnetic field extending around the main coil portion are made different from each other. More particularly, due to the auxiliary coil portion which constitutes a closed circuit together with the main coil portion and in which an electric current flows simultaneously with the main coil portion, the magnetic flux of the main coil portion is bent, thus allowing this main coil portion to have directivity. Hence, the auxiliary coil portion makes it possible for the antenna coil to have a desired directivity through deflection of the magnetic flux of the main coil portion, without wasteful consumption of the main coil portion magnetic flux, unlike a shield. Therefore, reduction in the magnetic field strength of the antenna coil is restricted and reduction in the transmission efficiency of the antenna coil can be less also. In this way, with the characterizing feature of the present invention, it is possible to realize an antenna coil capable of forming a magnetic field in a desired direction in an efficient manner, while suppressing leakage of magnetic flux into a space other than the space in which the magnetic field is formed.

In the above arrangement of the inventive antenna coil, preferably, vector of the magnetic flux of the main coil portion at the axial end of the auxiliary coil portion is deflected in the direction along the second reference axis, relative to vector of the magnetic flux of the main coil portion at a virtual end set opposite to the axial end across the main coil portion. With this further characterizing feature, due to the deflection of the magnetic flux of the main coil portion in the direction along the second reference axis at the axial end of the auxiliary coil portion as compared with the virtual end, the directivity of the main coil portion can be made different as desired. Namely, it becomes possible to provide the antenna coil with directivity in a more desirable manner through bending of the magnetic flux of the main coil portion by the auxiliary coil portion.

Through experiments conducted by the present inventors, it has been found that directivity and efficiency of an antenna coil will be different, depending on the numbers of the turns and inductances of the main coil portion and the auxiliary coil portion. Thus, it is preferred that inductances of the main coil portion and the auxiliary coil portion should be set appropriately. In doing so, since the main magnetic field of the antenna coil is the magnetic field depending on the main coil portion, the inductance of the main coil portion should be set with higher priority. According to one preferred embodiment of the inventive antenna coil, the sum of inductance(s) of one or more auxiliary coil portions is set smaller than the sum of inductance(s) of one or more main coil portion(s). With this arrangement, it becomes possible to realize an antenna coil having good balance in terms of the directivity and the efficiency.

The magnetic flux of the main coil portion spreads radially. Thus, if a plurality of the auxiliary coil portions are provided, it is possible to deflect the magnetic flux of the main coil portion with effective suppression of leakage. Further, in case a plurality of the auxiliary coil portions are provided, it is desired to provide them as compact as possible with view to the size of the antenna coil as a whole, and it is preferred that the auxiliary coil portions respectively be a coil having a smaller diameter than the main coil portion. Therefore, the inductance of a single auxiliary coil portion is smaller than that of the main coil portion. Then, in order to ensure a required inductance, preferably, the auxiliary coil portion includes a core made of magnetic material. According to one preferred embodiment of the inventive antenna coil, the auxiliary coil portion is formed by winding a length of conductor wire around an auxiliary coil core formed of magnetic material and disposed along the second reference axis.

Further, in the inventive antenna coil according to the present invention, preferably, the auxiliary coil portion is disposed such that of components of a current flowing in the auxiliary coil portion, a component parallel with the circumferential direction of the main coil portion has a same direction as a current flowing in the main coil portion on the side proximate to this main coil portion. With this arrangement, it becomes possible to restrict occurrence of reduction in the strength of the magnetic field generated by the main coil portion due to cancellation of the magnetic flux of the main coil portion by the magnetic flux of the auxiliary coil portion. It is therefore made possible to restrict reduction in the transmission efficiency of the antenna coil.

Also, preferably, at least one auxiliary coil portion is disposed along one axial end face of the main coil portion and has a smaller diameter than the main coil portion. Generally, the magnetic field formed around the main coil portion by current flowing in this main coil portion has a spreading in the direction along the first reference axis. With the above-described arrangement, the auxiliary coil portion is disposed along one axial end face of the main coil portion. By this auxiliary coil portion, of magnetic fluxes forming the magnetic field around the main coil portion and spreading in the direction along the first reference axis, magnetic flux which should travel from the one axial end face towards the outside along the first reference axis is guided by the auxiliary coil portion. With this, it becomes possible to provide the antenna coil with directivity favorably, with effective suppression of the magnetic field spreading along the first reference axis on this on axial side of the first reference axis. Further, as an axial coil portion having a smaller diameter than the main coil portion is employed in this arrangement, it is possible to restrict enlargement of the antenna coil.

With the above-described arrangement, it is possible to provide the antenna coil with directivity, with deflection of the spreading direction of the magnetic field. In this, in case the antenna coil is used in a magnetic resonance type power supply apparatus, the magnetic field generated by this antenna coil needs to be the magnetic field coupling a power supplying circuit and a power receiving circuit that resonate with each other. Therefore, preferably, the directivity of the antenna coil is on the mutually opposing side of the power supplying circuit and the power receiving circuit, that is, the mutually opposing side of the antenna coils. As a preferred embodiment for realizing such correlation as above, the inventive antenna coil is provided in at least one of a power supplying circuit and a power receiving circuit of a magnetic resonance power supplying apparatus for effecting wireless power supply, and the auxiliary coil portion is disposed along a back face side axial end face which is the axial end face opposite to the side opposed to the other antenna coil.

The magnetic field spreads omnidirectionally along the radial direction of the main coil portion from the axial end portion of the main coil portion to the axial outer side thereof. Therefore, in order to guide the magnetic flux with using the auxiliary coil portion and to suppress magnetic flux leakage, preferably, a plurality of auxiliary coil portions are disposed along the circumferential direction of the main coil portion. Moreover, it is also preferred to minimize an area where suppression of the leakage magnetic flux is weakened in the circumferential direction of the main coil portion. Accordingly, according to one preferred embodiment of the inventive antenna coil, a plurality of the auxiliary coil portions are disposed equidistantly along the circumferential direction of the main coil portion.

In order to effectively guide the magnetic flux generated by current flowing in the main coil portion, preferably, the auxiliary coil portion is disposed adjacent the main coil portion in the radial direction of the main coil portion. Therefore, according to one preferred embodiment of the inventive antenna coil, the auxiliary coil portion is disposed in such a manner as to have a portion thereof overlapped with the main coil portion as seen along the axial direction of the first reference axis.

In order to make the inventive antenna coil usable in a great variety of products, it is preferred that this antenna have a shape allowing easy installment. For instance, if the main coil portion has a short length along the direction of the first reference axis, it is possible to form the antenna coil thin and small. As an embodiment for realizing this, in the inventive antenna coil, preferably, the main coil portion is formed like a coil along a reference plane perpendicular to the first reference axis.

MODES OF EMBODYING THE INVENTION

First Embodiment

Figure 1:
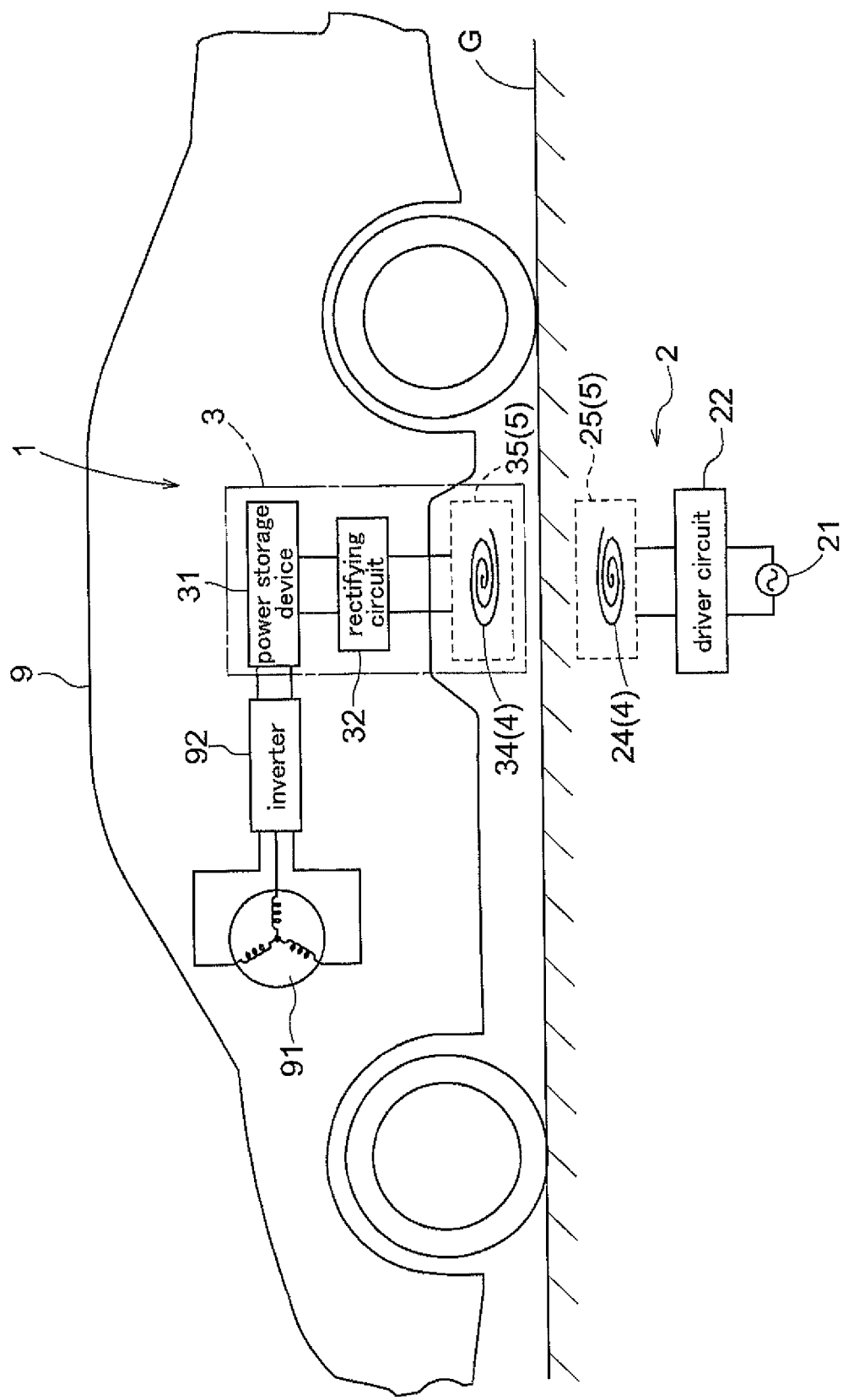
FIG. 1 is a block diagram schematically showing a configuration of a wireless power supply system.

Next, embodiments of the present invention will be explained with reference to the accompanying drawings, taking a wireless power supply system for effecting wireless power supply to a vehicle, for example. As shown in FIG. 1, a wireless power supply system 1 (magnetic resonance power supply apparatus) is comprised of a power supplying system 2 installed at a power supply facility and a power receiving system 3 mounted on a vehicle 9. In the instant embodiment, the power supplying system 2 is installed near a ground surface G in the case of an outdoor facility or near a floor surface in the case of an indoor facility.

Figure 2:
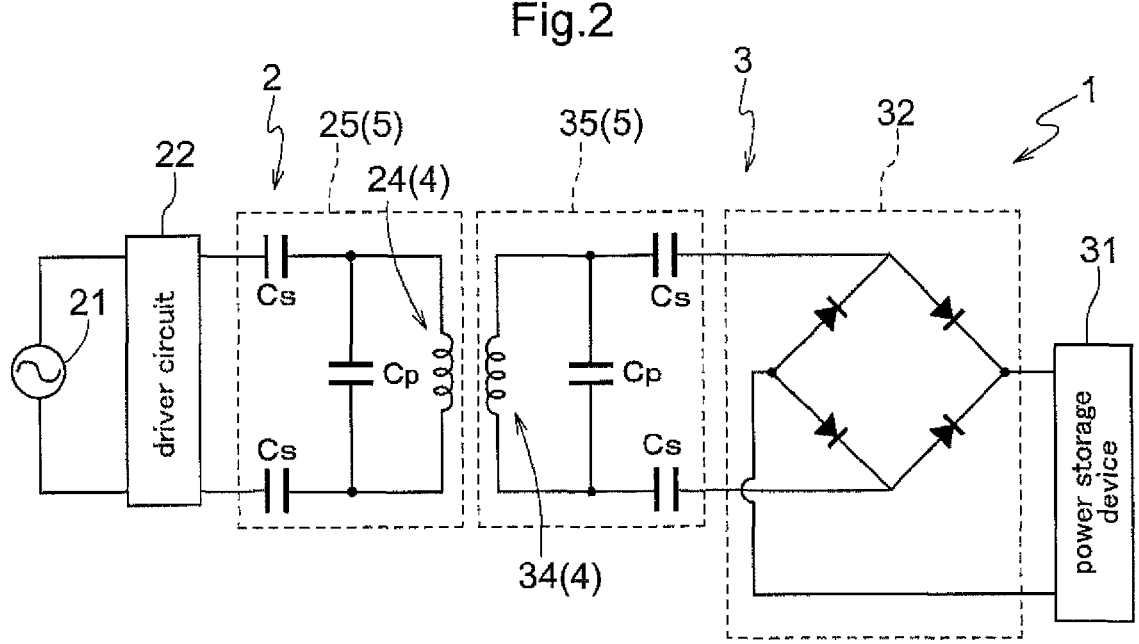
FIG. 2 is a circuit block diagram schematically showing the configuration of the wireless power supply system.

As shown in FIG. 1 and FIG. 2, the power supplying system 2 includes an AC power source 21, a driver circuit 22 and a power supplying side resonance circuit 25. The power supplying side resonance circuit 25 includes a power supplying side resonance coil 24. The power receiving system 3 includes a power receiving side resonance circuit 35, a rectifying circuit 32, and a power storage device 31. The power receiving side resonance circuit 35 comprises a power receiving side resonance coil 34. The power supplying side resonance circuit 25 and the power receiving side resonance circuit 35 are resonance circuits having a same natural frequency (resonant frequency) and these circuits will be generically referred to as the "resonance circuit 5" hereinafter. Further, the power supplying side resonance coil 24 and the power receiving side resonance coil 34 will be generically referred to as the "resonance coil" or "antenna coil 4", hereinafter.

The AC power source 21 of the power supply system 2 is a power source (system power source) supplied from a commercial power distribution network owned by a power company and its frequency is e.g. 50 Hz or 60 Hz. The driver circuit 22 is a circuit configured to convert 50 Hz or 60 Hz frequency of the system power source to the resonant frequency of the power supplying side resonance circuit 25 (resonance circuit 5) and this circuit 22 is constituted of a high-frequency power circuit. The power storage device 31 of the power receiving system 3 is a rechargeable DC power source, which can employ e.g. a secondary battery or capacitor of lithium ion, nickel metal hydride. Power received by the power receiving side resonance circuit 35 is an AC power having the resonant frequency of this power receiving side resonance circuit 35. The rectifying circuit 32 is a circuit that rectifies the AC power having this resonant frequency to DC current.

Incidentally, the driver circuit 22 and the power supplying side resonance circuit 25 together or the power supply system 2 as a whole, corresponds to a "power supplying circuit" in the broad sense of the term. Further, the power supplying resonance circuit 25 corresponds to the power supplying circuit in the narrow sense of the term. Similarly, the power receiving side resonance circuit 35 and the rectifying circuit together, or the power receiving system 3 as a whole, corresponds to the "power receiving circuit" in the broad sense of the term. Further, the power receiving side resonance circuit 35 corresponds to the power receiving circuit in the narrow sense of the term.

The vehicle 9 can be e.g. an electric automobile driven by a rotary electric device 91, or a hybrid automobile driven by an unillustrated internal combustion engine and the rotary electric device 91. The rotary electric device 91 is connected to the power storage device 31 via a rotary electric driving device such as an inverter 92 or the like. In the instant embodiment, the rotary electric device 91 is e.g. a three-phase AC rotary electric device. And, the rotary electric driving device is comprised of the inverter 9 for converting power between AC and DC, as its core component. The rotary electric device 91 can function as an electric motor as well as an electric power generator. In case the rotary electric device 91 functions as an electric motor, a driving force is generated as receiving power from the power storage device 91 via this inverter 92 (power running). On the other hand, in case the rotary electric device 91 functions as an electric power generator, an AC power generated by braking of the vehicle 9, a driving force from an internal combustion engine or the like is converted by the invertor 92 into a direct current, which is supplied to the power storage device 31 for regeneration (regenerative operation).

The wireless power supply system 1 (magnetic resonance power supply apparatus), as shown in FIG. 2, is a system configured to cause the pair of resonance circuits 5 (25, 35) to resonate via magnetic field and to supply power via this magnetic field. Meanwhile, as a "resonance" technique utilizing "magnetism", the magnetic resonance imaging (MRI) often employed in the medical field is known. However, while the MRI utilizes the physical phenomenon: "resonance of magnetic spin", the "magnetic (magnetic-field) resonance power supply apparatus" relating to the present invention does not utilize such physical phenomenon. In the case of the "magnetic resonance power supply apparatus" relating to the present invention, as described above, two resonance circuits 5 are caused to resonate via "magnetic field". Therefore, in this disclosure, for the purpose including purpose of clear distinction from the so-called MRI, the method implemented by the wireless power supply system configured to supply power with utilization of resonance in magnetic field will be referred to as "magnetic resonance method". Further, this transmission technique differs also from the so-called "electromagnetic induction method". This will be described later herein.

Figure 3:
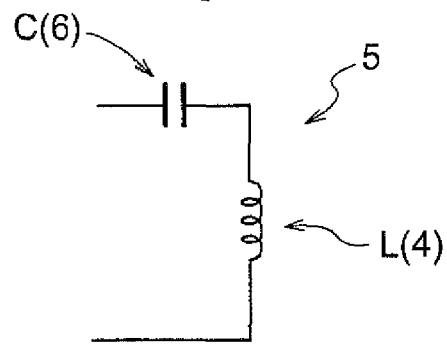
FIG. 3 is an equivalent circuit diagram of a resonance circuit.

The power supplying side resonance circuit 25 and the power receiving side resonance circuit 35 have a same natural frequency (resonant frequency). In the present embodiment, the power supplying side resonance circuit 25 and the power receiving side resonance circuit 35 are LC resonators of an identical configuration. Accordingly, in the following discussion, when there is no need of distinction therebetween, these will be referred to as the "resonance circuit 5". As shown in the equivalent circuit diagram of FIG. 3, the resonance circuit 5 includes the antenna coil 4 having an inductance component "L" and a capacitor 6 having a capacitance component "C". In the present embodiment, as shown in FIG. 2, the capacitance component "C" is synthesis of capacitance components (Cs, Cs, Cp) of three capacitors.

The power supplying side resonance circuit 25 and the power receiving side resonance circuit 35 are circuits having a same resonant frequency. For instance, similarly to the phenomenon that one of two tuning forks spaced apart from each other is caused to vibrate in air, the other tuning fork too will vibrate as resonating with vibration propagated via the air, the power supplying side resonance circuit 25 and the power receiving side resonance circuit 35 too resonate. More particularly, in resonance to vibration transmitted to the power receiving side resonance circuit 35 via magnetic field generated by resonance (electromagnetic vibration) of the power supplying side resonance circuit 25, the power receiving side resonance circuit 35 too resonates (electromagnetically vibrates).

Incidentally, as a method of contactless power transmission, the "electromagnetic induction method" is known. In particular, a circuit configuration of the magnetic induction method type utilizing magnetic coupling is very similar to that shown in FIG. 2. However, the "electromagnetic induction method" utilizes an electromotive force generated in response to change in strength of magnetic flux extending between coils. Hence, in this method, coupling (magnetic coupling) between coils is predominant. In the electromagnetic induction method, the coupling strength between two circuits is often represented as self inductances (L1, L2) of the two respective coils and a relative inductance M. The coupling strength of "1" is obtained when all of magnetic fluxes generated by the two coils interlink each other.

$$\frac{M}{\sqrt{L1 \cdot L2}} \quad (1)$$

On the other hand, in the case of the "magnetic resonance method", both the "magnetic coupling" due to the inductance L between the two resonance circuits 5 and a "field coupling" due to the capacitance C significantly affect transmission efficiency. That is, the performance of the resonance circuit 5 as an LC resonator too affects the transmission efficiency significantly. In the wireless power supply by the "magnetic resonance method", the transmission efficiency of power supply is predominated by parameters of "coupling coefficients" of the power supplying side resonance circuit 25 and the power receiving side resonance circuit 35 together constituting the wireless power supply system 1 (this may be referred to also as "coupling coefficient of the resonance circuit 5" hereinafter) and "no-load Q" of the resonance circuit 5 (sharpness of sympathetic vibration at the time of no-load).

Here, as the coupling coefficient, the coupling strength in the electromagnetic induction method can be employed, so its detailed explanation will be omitted herein. Whereas, the no-load Q, in the equivalent diagram shown in FIG. 2, this is represented by the following formula (2), where R represents the resistance component of the circuit. Incidentally, in this case, it is assumed that the two resonance circuits 5 caused to resonate have same circuit constants (L=L1=L2, C=C1=C2, R=R1=R2).

$$Q = \frac{1}{R} \cdot \sqrt{\frac{L}{C}} \quad (2)$$

The transmission efficiency of the magnetic resonance method is predominated by "a product kQ" which is a product of the coupling coefficient k of the resonance circuits 5 and the no-load Q of the resonance circuits 5. Accordingly, in the magnetic resonance method, the transmission efficiency is increased, preferably, by raising (increasing) the no-load Q. As one preferred embodiment, the no-load Q is set to "100" or more.

Meanwhile, more particularly, the efficiency of the wireless power supply system 1 is a product of the efficiency of the driver circuit 22 of the power supplying system 2, the efficiency (the above-described "product kQ") of space transmission portion constituted by the power supplying side resonance circuit 25 and the power receiving side resonance circuit 35, and the efficiency of the rectifying circuit 32. The driver circuit 22 and the rectifying circuit 32 both are circuits for effecting frequency conversion and the efficiencies thereof are predominated by frequency characteristics of semiconductor elements constituting these circuits.

In the above, the principle of the wireless power supply system 1 of the magnetic resonance method has been explained. However, it is preferred that this wireless power supply system 1 be capable of power supply with high transmission efficiency, while effectively suppressing magnetic flux leakage into space other than the space in which the magnetic field coupling the power supplying side and power receiving side resonance circuits 5 to each other is formed. In order to realize this, the present invention is characterized by the antenna coil 4 included in the resonance circuits 5. Next, preferred configurations of the antenna coil 4 relating to the present invention and a preferred method for manufacturing such antenna coil 4 will be explained.

Figure 4:
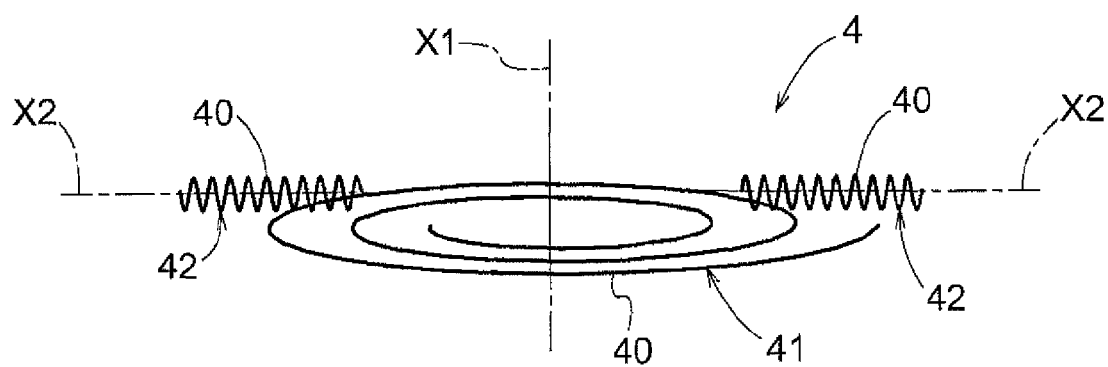
FIG. 4 is a view showing a basic configuration of an antenna coil.
Figure 5:
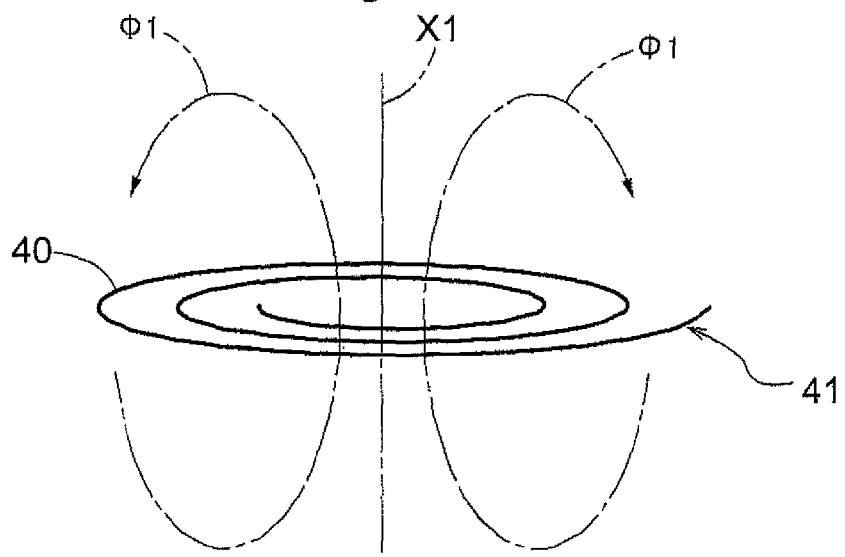
FIG. 5 is a diagram showing a magnetic field generated by a current flowing in a main coil portion.
Figure 6:
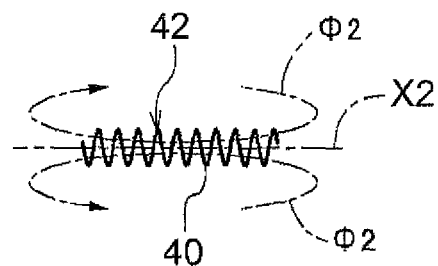
FIG. 6 is a diagram showing a magnetic field generated by a current flowing in an auxiliary coil portion.

The antenna coil 4 relating to the present invention, as shown in FIG. 4, includes a main coil portion 41 formed by winding a length of conductor wire 40 around a first reference axis X1 and an auxiliary coil portion 42 provided at least one along one axial end face of the main coil portion 41 and having a smaller diameter than the main coil portion 41. The auxiliary coil portion 42 is formed by winding the conductor wire 40 around a second reference axis X2 which is different from the first reference axis X1. Here, in the main coil portion 41, by an electric current flowing in this main coil portion 41, magnetic fluxes Φ1 are generated as shown in FIG. 5. Further, in the auxiliary coil portion 42, by an electric current flowing in this auxiliary coil portion 42, magnetic fluxes Φ2 are generated as shown in FIG. 6.

The magnetic fluxes Φ1 generated by the current flowing in the main coil portion 41, as shown in FIG. 5, spread to the opposed sides along the axial direction of the first reference axis X1. Therefore, if the antenna coil 4 is disposed at a bottom of the vehicle 9 as shown in FIG. 1, these magnetic fluxes Φ1 can exert influence to an iron plate mounted at the bottom of the vehicle 9 and/or devices or instruments disposed inside the vehicle 9. Namely, in case the magnetic flux of the antenna coil 4 has no directivity regarding the direction along the first reference axis X1 like the magnetic fluxes Φ1 of the main coil portion 41, leakage of magnetic flux into a space other than a space where a magnetic field coupling the power supplying side and power receiving side resonance circuits 5 together is formed will affect such other space.

For this reason, the antenna coil 4 includes the auxiliary coil portion 42, in addition to the main coil portion 41. The auxiliary coil portion 42 is provided along one axial end face of the main coil portion 41. With this, magnetic fluxes (Φ4) of the antenna coil 4 are provided with directivity with respect to the direction along the first reference axis X1.

Figure 7:
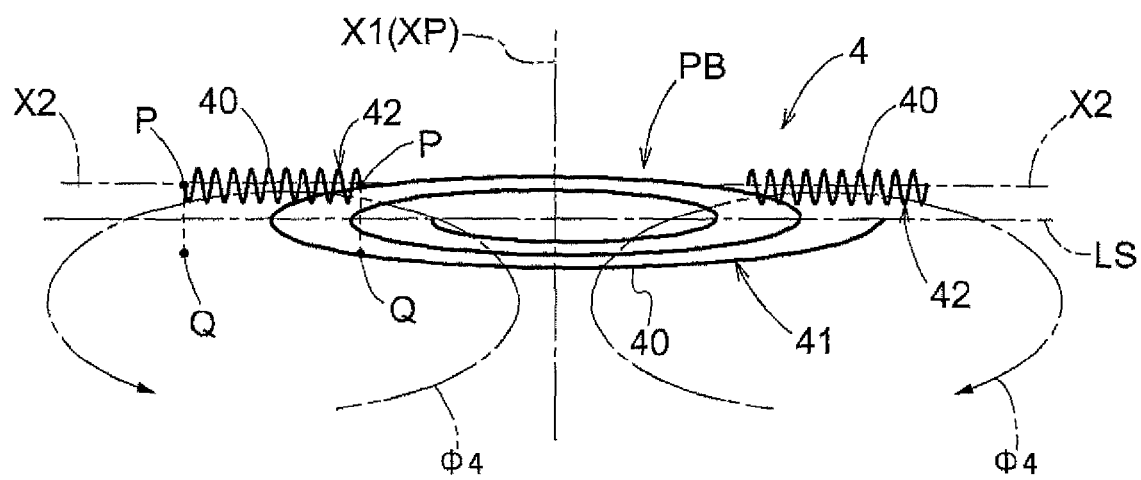
FIG. 7 is a diagram showing magnetic fields generated by current flowing in the antenna coil.

As shown in FIG. 7, on the side where the auxiliary coil portions 42 are present (one axial end face side of the first reference axis X1 (the upper side in FIG. 7, the side of a back face side axial end face PB which will be described later)), the magnetic fluxes (Φ1) of the main coil portions 41 return to the other axial end face side without spreading to said one axial end face side of the first reference axis X1 (the side of a back face side axial end face PB), via the auxiliary coil portions 42 as bypassing circuits (magnetic fluxes Φ4). On the other hand, on the other axial end face where the auxiliary coil portions 42 are not provided (the lower side in FIG. 7), the magnetic fluxes spread in the axial direction of the first reference axis X1 (magnetic fluxes Φ4). In this way, spreading of magnetic flux to either one side of the first reference axis X1 is suppressed and also spreading thereof to the other side is not interfered. Namely, on one side of the first reference axis X1, adverse influence of the magnetic field to the iron plate at the bottom of the vehicle 9 or instruments or devices disposed inside the vehicle 9 can be suppressed; and on the other side thereof, the magnetic fluxes for magnetic field resonance can be applied to the corresponding respective resonance circuits 5.

The second reference axis X2 as the winding axis of the auxiliary coil portion 42 is set in a direction intersecting the magnetic flux Φ1 of the main coil portions 41 at an axial end of the auxiliary coil portion 42. In this case, of the two axial ends of the auxiliary coil portion 42, the second reference axis X2 is set to intersect the magnetic flux Φ1 of the main coil portions 41, at one axial end on the radially inner side of the main coil portion 41. In this, the second reference axis X2 is set to a direction preferably substantially perpendicular to the magnetic flux Φ1 of the main coil portions 41. In the present example, as shown in FIG. 7, the second reference axis X2 is disposed to be perpendicular to the first reference axis X1. With this arrangement, the second reference axis X2 is disposed with an orientation perpendicular to the magnetic flux Φ1 passing through the mounting face (reference plane PR, see FIG. 10) of the main coil portions 41. Therefore, the second reference axis X2 is disposed to be perpendicular to the magnetic flux Φ1 of the main coil portions 41, even in the vicinity of the one axial end face of the main coil portion 41 where the auxiliary coil portion 42 is disposed. And, as will be described later with reference to FIG. 16, the auxiliary coil portion 42 is disposed such that of components of the current flowing in this auxiliary coil portion 42, components parallel to the circumferential direction of the main coil portion 41 are oriented along the same direction as the current (I1) flowing in the main coil portion 41 on the side proximate to the main coil portion 41.

Figure 8:
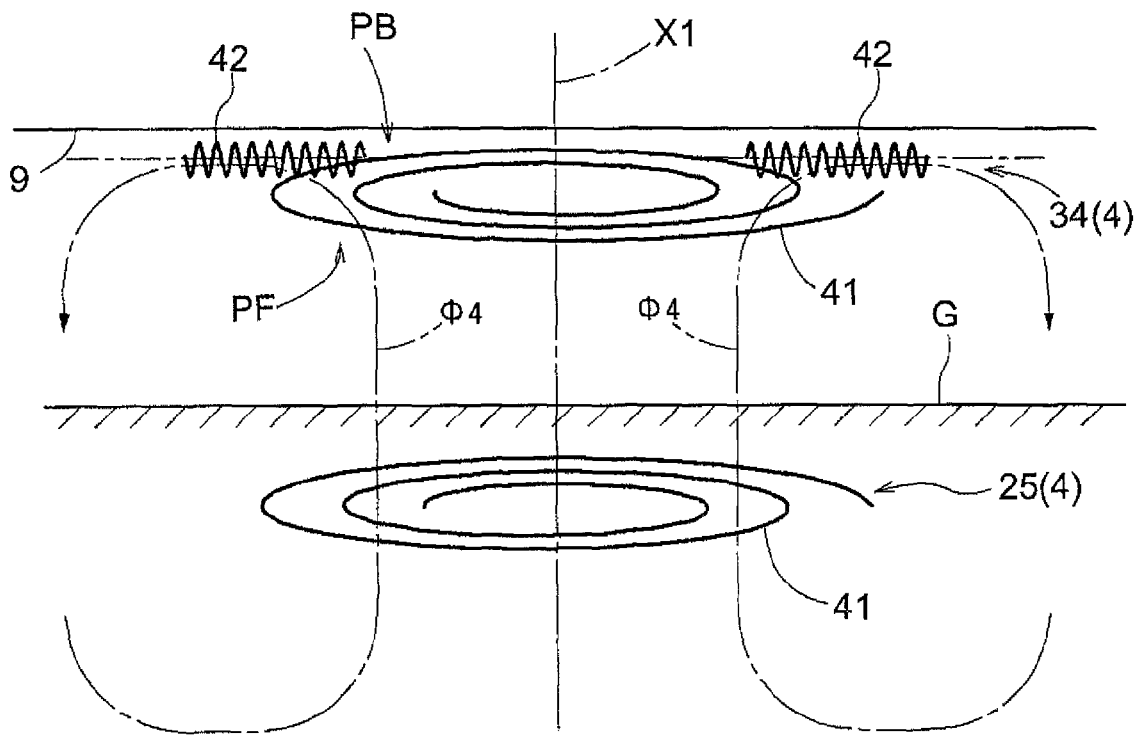
FIG. 8 is a diagram showing an example of relationship between a magnetic field and an antenna coil mediating magnetic field resonance.
Figure 9:
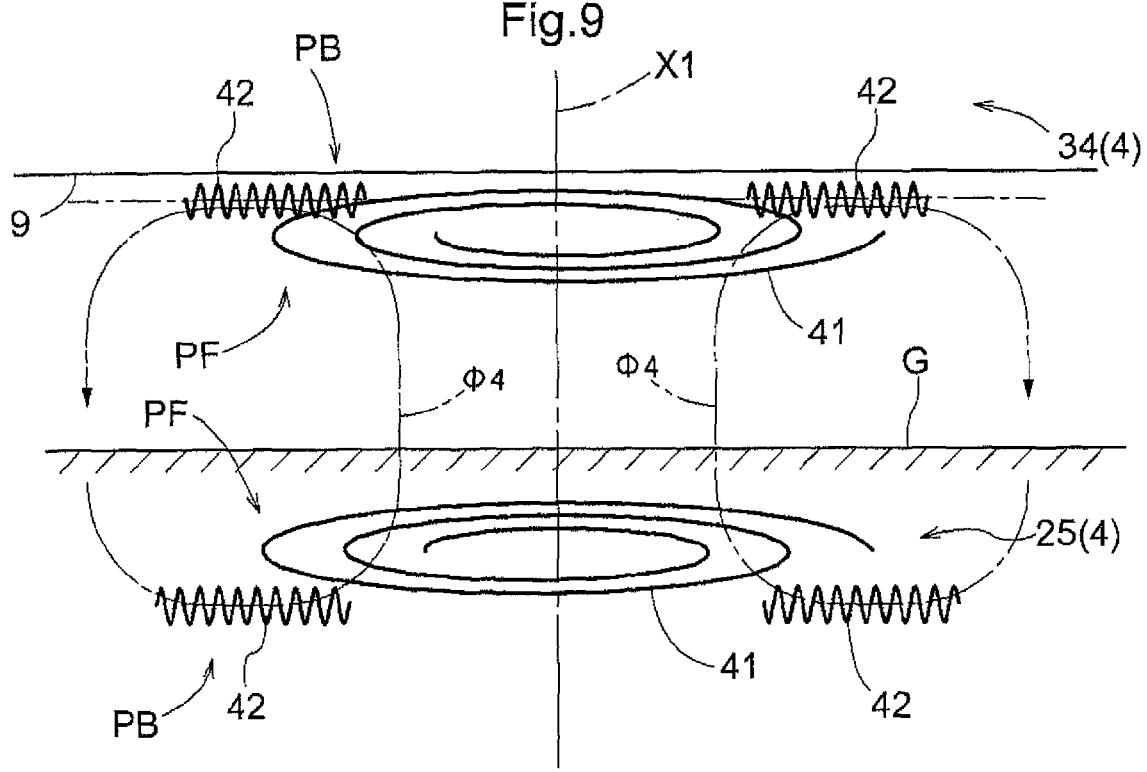
FIG. 9 is a diagram showing another example of relationship between a magnetic field and an antenna coil mediating magnetic field resonance.

The auxiliary coil portion 42 is provided in at least one of the antenna coils of the power supplying system 2 and the power receiving system 3, or preferably in the antenna coil 4 of the power receiving system 3 (the power receiving side resonance coil 34). As shown in FIG. 8, the power receiving side resonance coil 34 includes an auxiliary coil portion 42 disposed along the back face side axial end face PB which is the axial end face opposite to or away from the side opposed to the power supplying side resonance coil 24 as the other antenna coil 4 (opposing side axial end face PF). With this the magnetic flux Φ4 interlinked with the bottom face of the vehicle 9 or the inside of the vehicle 9 is suppressed. Incidentally, as a matter of course, the auxiliary coil portion 42 can be provided in both of the antenna coils 4 of the power supplying system 2 and the power receiving system 3, as shown in FIG. 9. In case the auxiliary coil portion 42 is provided in the power supplying system 2, the power supplying side resonance coil 24 will include an auxiliary coil portion 42 which is disposed along the back face side axial end face PB which is the axial end face opposite the side (opposing side axial end face PF) to be opposed to the power receiving side resonance coil 34 as the other antenna coil 4 at the time of power supply.

In the instant embodiment, as described above, the second reference axis X2 of the auxiliary coil portion 42 is set to the direction substantially perpendicular to the magnetic flux Φ1 of the main coil portion 41. However, as may be apparent from FIG. 8 and FIG. 9, it suffices for the antenna coil 4 to have such directivity as reducing leakage of magnetic flux toward the back face than toward the back face side axial end face PB in the direction along the first reference axis X1. Therefore, the second reference axis X2 can be disposed with a depression angle for progressive inclination from the back face side axial end face PB toward the opposing side axial end face PF as it extends toward the radial outer side of the main coil portion 41. Even with provision of such depression angle, as long as this angle is confined substantially within 45 degrees, it can be said that the auxiliary coil portion 42 is disposed along the back face side axial end face PB. This applies also to a second embodiment which will be described later with reference to FIGS. 22-27. In the second embodiment, there is illustrated a configuration in which the second reference axis X2 is disposed parallel to the first reference axis X1. However, the second reference axis X2 may have a depression angle for inclination toward the axial end face of the main coil portion 41.

Further, the back face side axial end face PB and the auxiliary coil portion 42 can be spaced apart from each other, rather than in contact with each other. As may be apparent from FIG. 8 and FIG. 9, it will suffice to dispose the auxiliary coil portion 42 at a position where bypassing of the magnetic flux Φ1 is desired, such as the bottom of the vehicle 9. For instance, the auxiliary coil portion 42 can be disposed between an object present between the back face side axial end face PB of the main coil portion 41 and the bottom face of the vehicle 9 and the flat face side axial end face PB of the main coil portion 41. This applies also to the second embodiment which will be described later.

Figure 10:
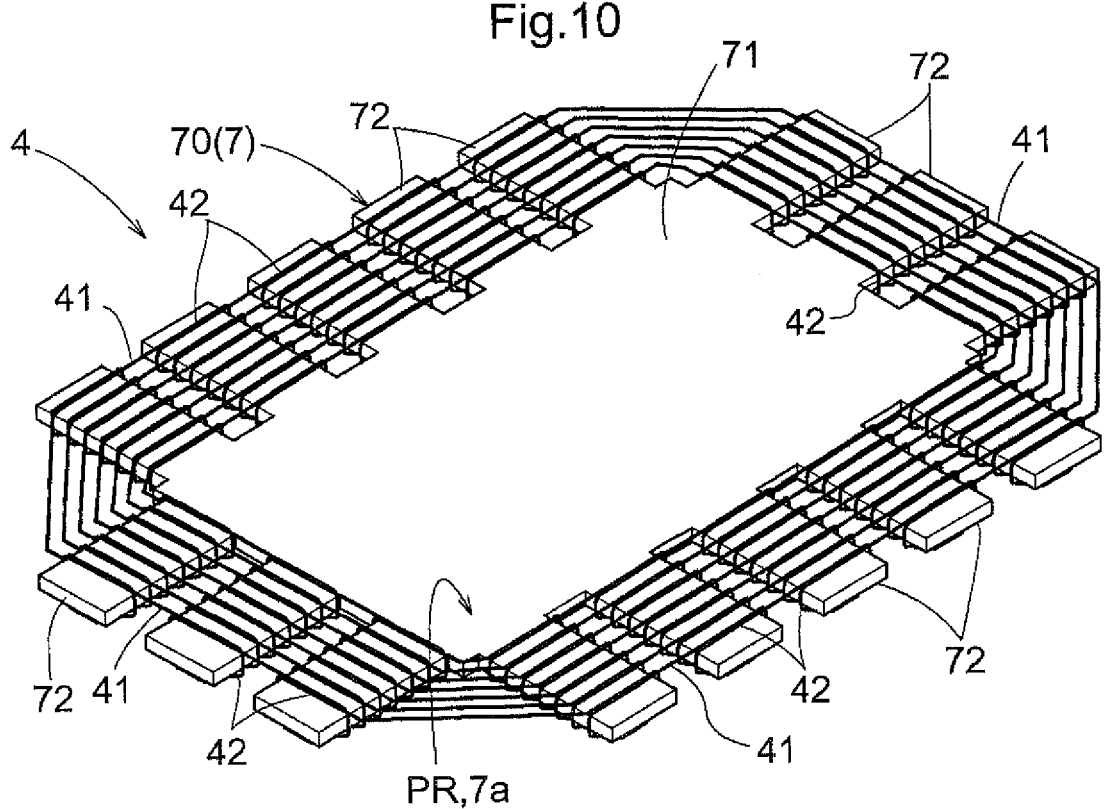
FIG. 10 is a perspective view showing one example of antenna coil.
Figure 11:
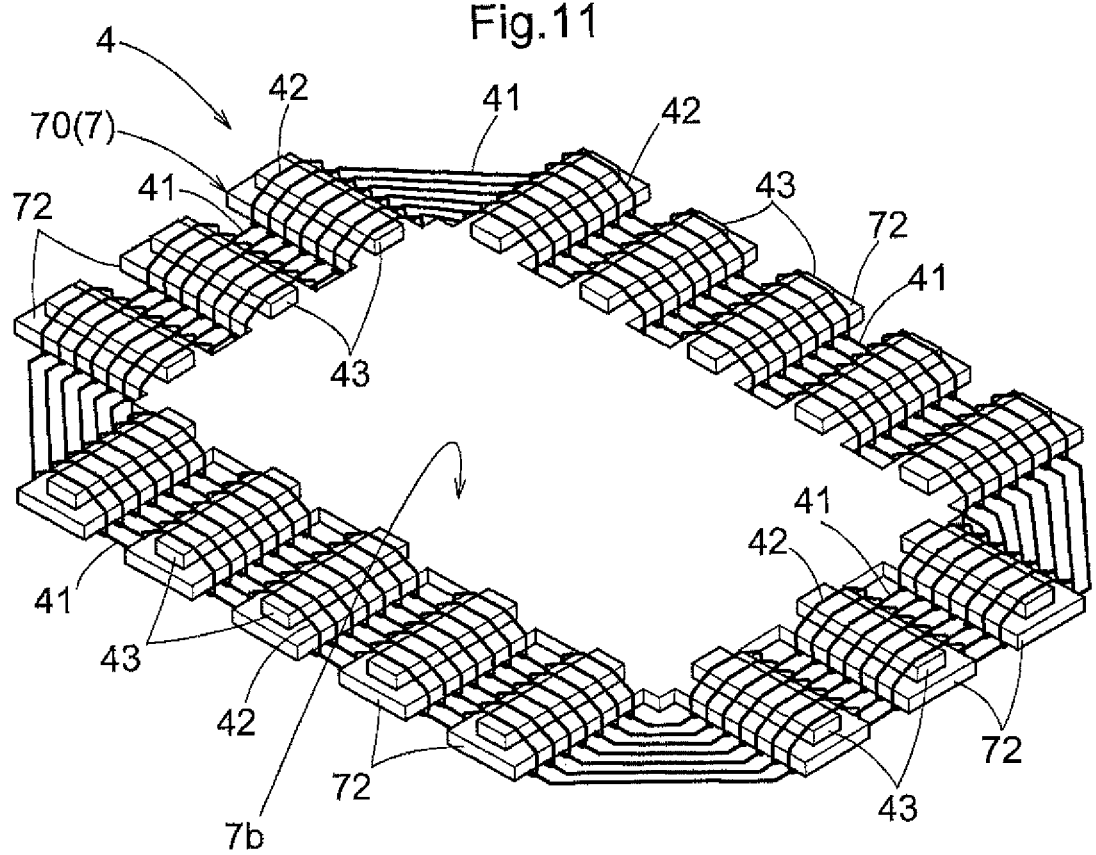
FIG. 11 is a perspective view showing one example of antenna coil.

In the above, the configuration concept of the antenna coil 4 has been explained. FIG. 10 and FIG. 11 show one example of specific configuration of the antenna coil 4. FIG. 10 is a perspective view of the antenna coil 4 as seen from the opposing side axial end face PF which is the axial end face on the opposing side at the time of power supply. FIG. 11 is a perspective view of the antenna coil 4 as seen from the back face side axial end face PB. In this example, the antenna coil 4 includes 16 (sixteen) auxiliary coil portions 42. The magnetic field spreads omnidirectionally in the radial direction of the main coil portion 41. Therefore, in order to suppress the leakage magnetic flux through guidance of thereof with use of the auxiliary coil portions 42, it is preferred that the plurality of auxiliary coil portions 42 be disposed along the circumferential direction of the main coil portion 41.

Further, in order to minimize an area of weakening of the suppression of leakage magnetic flux in the circumferential direction of the main coil portion 41, it is preferred that the auxiliary coil portions 42 be disposed equidistantly in the circumferential direction of the main coil portion 41. In case the main coil portion 41 has an annular shape as seen in the direction along the first reference axis X1, the above arrangement can be easily realized by setting the second reference axes X2 along the circumferential direction of the main coil portion 41 at same angular spacing. Further, in case the main coil portion 41 has a rectangular ring-like shape as seen in the direction along the first reference axis X1, is preferred that the auxiliary coil portions 42 be disposed uniformly at each side thereof as illustrated in FIG. 10 and FIG. 11, for example. In this case too, the arrangement can be said an arrangement of equidistant spacing along the circumferential direction of the main coil portion 41. Similarly, also in the case of the main coil portion 41 having an oval or track-like shape, it is preferred that the auxiliary coil portions 42 be disposed with substantially same spacing therebetween along the circumferential direction of the main coil portion 41.

Through experiments conducted by the present inventors, it has been found that directivity and efficiency of an antenna coil will be different, depending on the numbers of the turns and inductances of the main coil portion and the auxiliary coil portion. The inductances of the main coil portion 41 and the auxiliary coil portion 42 will be set appropriately, depending on the particular specifications of the wireless power supplying system 1. In this, as one view point to be taken into consideration, the inductance of the main coil portion 41 should have higher priority, since the magnetic field mediating resonance of the two resonance circuits 5 is a magnetic field depending mainly on the main coil portion 41. That is, the sum of inductances of the multiple auxiliary coil portions 42 should be set smaller than the sum of inductances of more or multiple main coil portions 41. In the instant embodiment, for one main coil portion 41, a plurality of auxiliary coil portions 42 are provided. In this case, for instance, the sum of the inductances of all of the multiple auxiliary coil portions 42 can be set smaller than the inductance of one main coil portion 41. With this, it is possible to realize an antenna coil having good balance in terms of directivity and efficiency.

Figure 12:
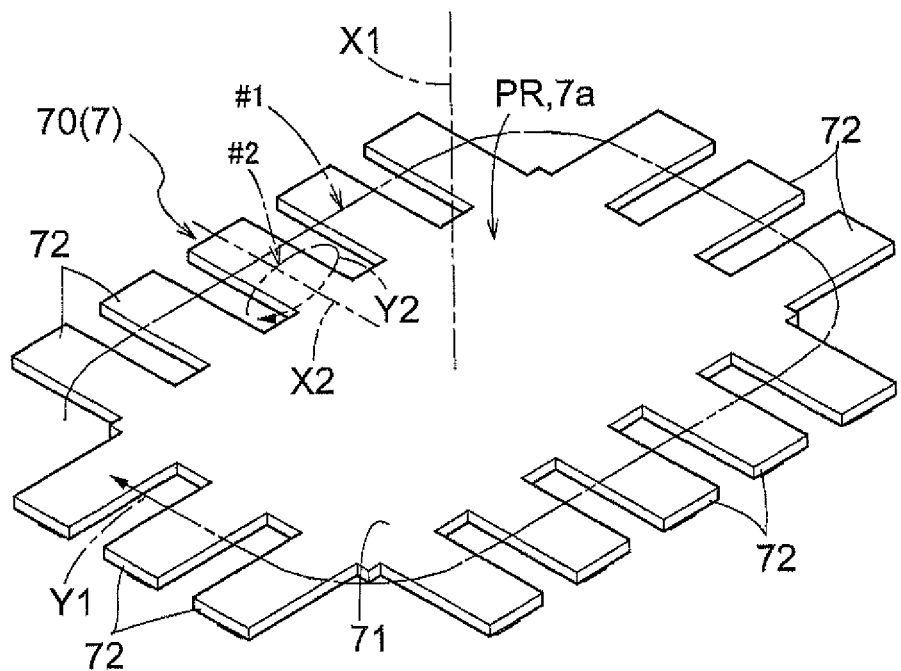
FIG. 12 is a perspective view of a substrate member.
Figure 13:
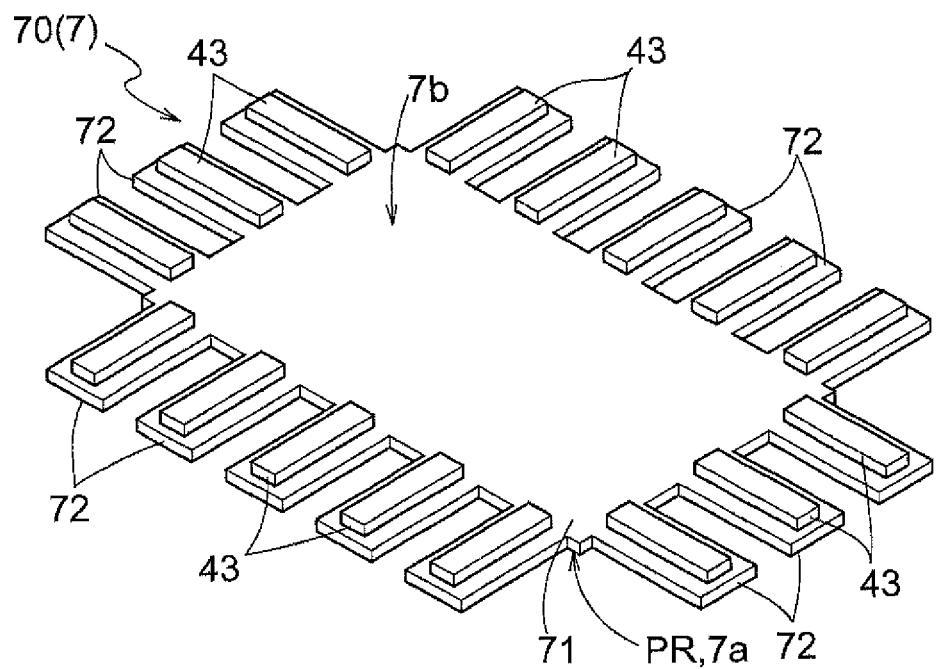
FIG. 13 is a perspective view of a substrate member.

In the present embodiment, the main coil portion 41 of the antenna coil 4 is provided in a spiral form along the reference plane PR perpendicular to the first reference axis X1 (see FIG. 10). For facilitating setting of this reference plane PR, during formation of the main coil portion 41, a plate-like substrate 70 (core member 7) illustrated in FIG. 12 and FIG. 13 is utilized. Preferably, this substrate 70 is formed of polycarbonate or polypropylene.

In the magnetic wireless power supply system 1, the paired LC resonators (the resonance circuits 5) are caused to resonate via magnetic field. The antenna coil corresponds to an inductor (L) in this LC resonator. As one exemplary mode, the capacitor of this LC resonator can be configured with use of the core member 7. In order to configure a capacitor having good high-frequency characteristics, it is preferred that the dielectric tangent of the core member 7 have a small value (e.g. less than 0.003 in a frequency range of interest). Polycarbonate and polypropylene are materials having small values of dielectric tangent which are approximately 0.002 or less, thus being suitable as the principal material for the core member 7.

The substrate 70 is provided with a plurality of axis portions 72 for setting the second reference axes X2. In other words, the second reference axes X2 of the auxiliary coil portions 42 are set by using the substrate 70 at multiple positions in the circumferential direction of the main coil portion 71 along the reference plane PR. These axis portions 72 are interconnected via a connecting portion 71. This connecting portion 71 is a flat face perpendicular to the first reference axis X1 and delimits the reference plane PR.

In order to provide the antenna coil 4 with desired directivity as well as high transmission efficiency, it is necessary to set each second reference axis X2 with good precision relative to the first reference axis X1 and also to set the plurality of second reference axes X2 with good precision relative to each other. In this regard, by the axis portions 72 formed in the substrate 70 (core member 7) which is a plate-like member delimiting the reference plane PR perpendicular to the first reference axis X1, the second reference axes X2 are set with good precision relative to the first reference axis X1. Further, thanks to the connecting portion 71, the relationship among the multiple axis portions 72 (the relationship among the second reference axes X2) too is set with good precision.

The auxiliary coil portion 42 is a coil having a smaller diameter than the main coil portion 41. Further, if a plurality of auxiliary coil portions 42 are disposed in distribution along the circumferential direction of the main coil portion 41, the diameter of the auxiliary coil portion 42 can be even smaller. Accordingly, the inductance of single auxiliary coil portion 42 tends to become smaller. Then, in order to secure a required inductance for the auxiliary coil portion 42, preferably, the auxiliary coil portion 42 includes an auxiliary coil core 43 formed of magnetic material, as shown in FIG. 11. In the instant embodiment, the auxiliary coil portion 42 is configured by winding a length of the conductor wire 40 around the auxiliary coil core 43 disposed along the second reference axis X2. Therefore, as shown in FIG. 13, at the axis portion 72 along the second reference axis X2 on the back face 7b of the substrate 7, the auxiliary coil core 43 is provided. Incidentally, the auxiliary coil core 43 is formed preferably of ferromagnetic material such as ferrite having a high magnetic permeability and a high specific resistance.

Further, in order to guide the magnetic flux generated by current flowing through the main coil portion 41 in an effective manner, the auxiliary coil portion 42 is disposed preferably adjacent the main coil portion 41 in the radial direction of this main coil portion 41. Therefore, the auxiliary coil portion 42, as shown in FIG. 10 and FIG. 11, is disposed in such a manner as to have a portion thereof overlapped with the main coil portion 41 as seen in the axial direction of the first reference axis X1.

According to experiments conducted by the present inventors, it was confirmed that the antenna coil 4 of the configuration illustrated in FIG. 10 and FIG. 11 has directivity having a difference of 20 times or more regarding the transmission efficiency (about 92%) in the direction of the opposing side axial end face PF relative to the transmission efficiency (about 4%) in the direction of the back face side axial end face PB. Also, with respect to the relationship between the transmission efficiency and a positional error of the first reference axis X1 when the power supplying side resonance coil 24 and the power receiving side resonance coil 34 are placed in opposition to each other, reduction in the transmission efficiency within the practical range (approximately 20 cm or less) was about 2%. That is, it was confirmed that the reduction in the transmission efficiency resulting from the addition of the directivity remains about 2%, which is sufficiently within the practical range. This eliminates the need to provide a shield of the like in the vehicle 9. Hence, restriction in the weight of components and in the costs of the vehicle 9 can be realized.

Next, one specific example of a method of manufacturing such antenna coil 4 will be explained. As shown in FIG. 12, the main coil portion 41 is formed through a main coil portion forming step #1 of winding a length of the conductor wire 40 around the first reference axis X1 in a spiral form along the reference plane PR perpendicular to the first reference axis X1. More particularly, at this main coil portion forming step #1, as indicated by an arrow Y1 in FIG. 12, the conductor wire 40 is wound in a spiral form along a surface 7a of the substrate 70 defining the reference plane PR perpendicular to the first reference axis X1.

The auxiliary coil portion 42 is formed through an auxiliary coil portion forming step #2 of winding the conductor wire 40 around the second reference axis X2 with a smaller diameter than the winding diameter of the conductor wire 40 at the main coil portion forming step #1. More particularly, at this auxiliary coil portion forming step #2, as indicated by an arrow Y2 in FIG. 12, the conductor wire 40 is wound in a spiral form around the axis portion 72 of the substrate 70 defining the second reference axis X2. This auxiliary coil portion forming step #2 is effected during winding of the conductor wire 40 around the first reference axis X1 at the main coil portion forming step #1. In this example, by effecting these steps, the main coil portion 41 and the auxiliary coil portion 42 are connected to each other so as to form a closed circuit. Meanwhile, the above language "during winding" is meant to include the beginning portion of the main coil portion forming step #1 as well as the ending portion of the main coil portion forming step #1.

Figure 14:
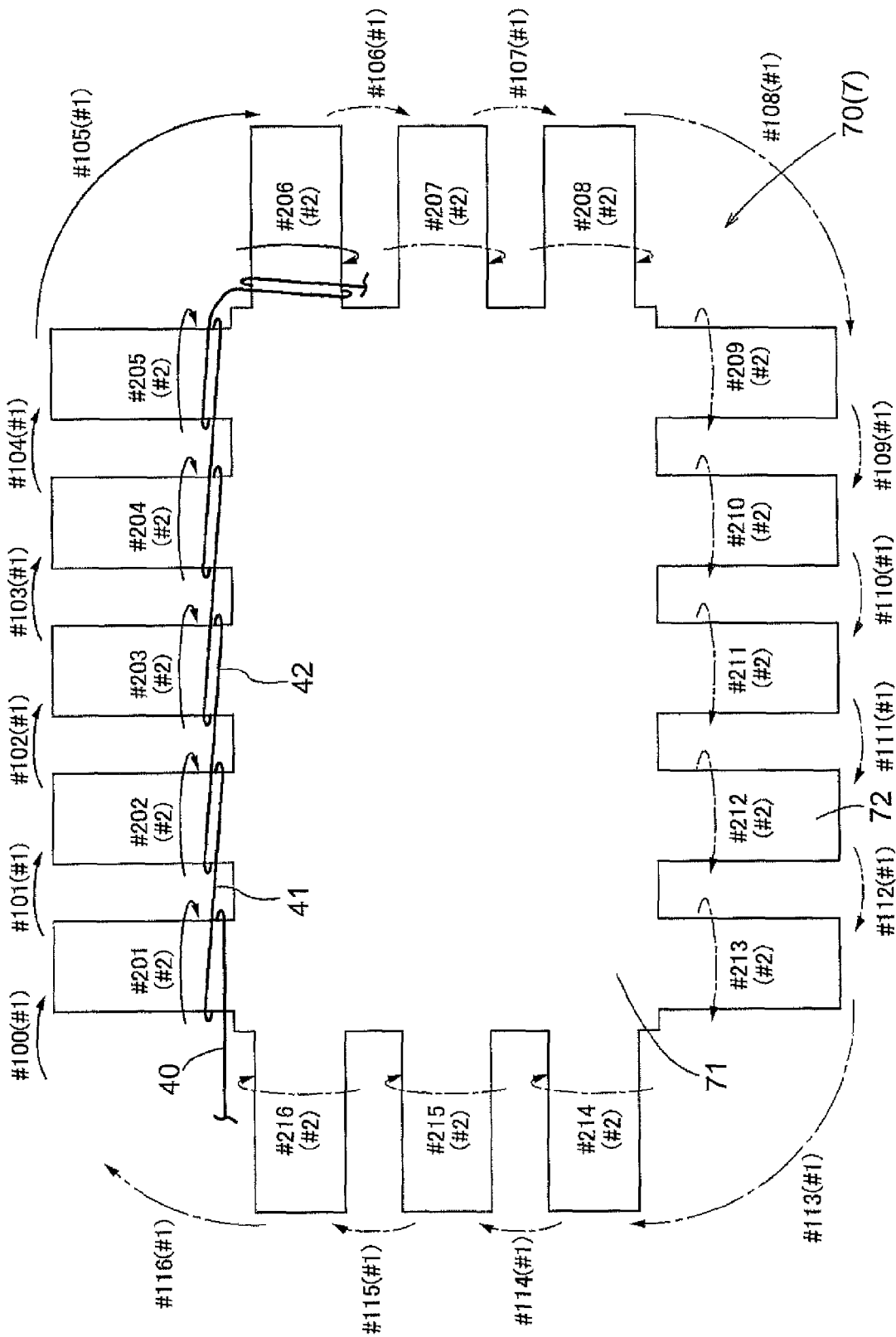
FIG. 14 is a view illustrating an order of winding a length of conductor wire around the substrate member.

According to one preferred embodiment, as shown in FIG. 14, the antenna coil 4 is formed by effecting the main coil portion forming step #1 and the auxiliary coil portion forming step #2 in repetition. More particularly, during winding of the conductor wire 40 around the first reference axis X1 at the main coil portion forming step #1, the auxiliary coil portion forming step #2 is effected for each one of the second reference axes X2 provided at 16 (sixteen) positions in the circumferential direction. In this case, as shown in FIG. 14, the operation will proceed with interrupting the main coil portion forming step #1 and effecting the auxiliary coil portion forming step #2 between the interrupted adjacent main coil portion forming steps, i.e. as =main coil portion forming step #100 (#1)→auxiliary coil portion forming step #201 (#2)→main coil portion forming step #101 (#1)→auxiliary coil portion forming step #201 (#2)→ . . . . In the mode of operation illustrated in FIG. 14, in a period in which 1 time (1 turn) of main coil portion forming step #1 is completed (#100-#116), sixteen times of auxiliary coil portion forming steps #2 (#201-#216) are effected.

Incidentally, at the auxiliary coil portion forming step #2, it is necessary to wind the conductor coil 40 with a small winding diameter. Further, in view of the fact that the main coil portion forming step #1 and the auxiliary coil portion forming step #2 are present in mixed state, it is preferred that the conductor wire 40 be made of a relatively flexible material. For instance, the conductor wire 40 can use a stranded wire formed of collection of a plurality of fine conductor wires.

Incidentally, in the main coil portion 41 and the auxiliary coil portion 42, if adjacent conductor wire 40 turns are too close to each other, there will occur too strong proximity effect, which is an interaction between currents flowing through adjacent conductor wire 40 turns due to the magnetic field induced by the current through the antenna coil 4. Namely, the proximity effects causes an effect of departing currents flowing in a same direction away from each other. And, this proximity effect is effective in the direction of reducing the no-load Q. Further, there will occur a floating capacitance (parasitic capacitor) between the conductor wire 40 turns, which capacitance can affect the impedance of the antenna coil 4. For this reason, preferably, the conductor wire 40 is wound somewhat coarsely, rather than densely between the turns. For instance, it is preferred that the conductor wire 40 be wound with inter-turn gap of 1 to 2 times of the wire diameter thereof.

Figure 15:
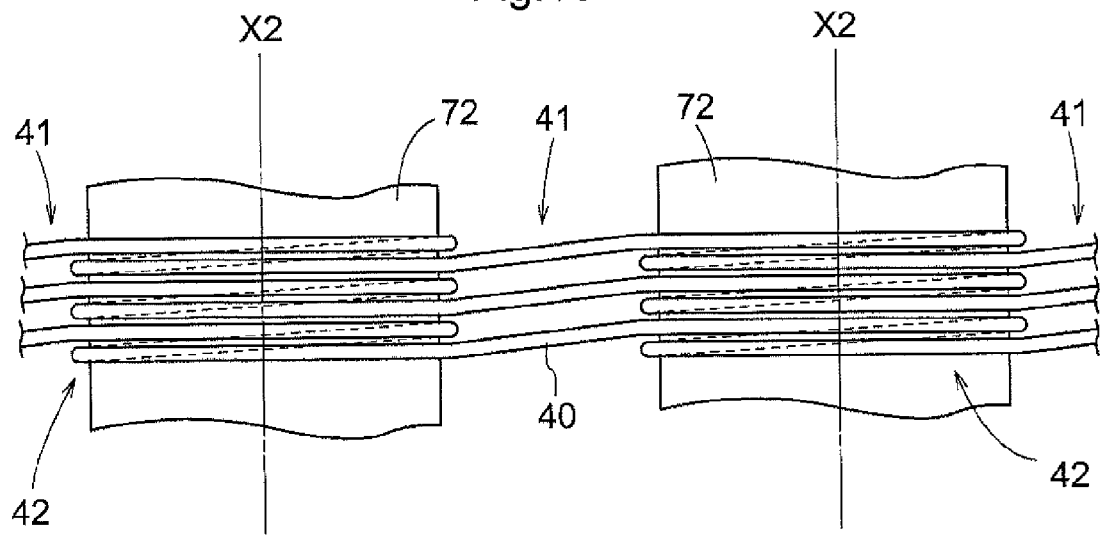
FIG. 15 is a partially enlarged view of a main coil portion and an auxiliary coil portion.

As described above, when the auxiliary coil portion forming step #2 is effected in the course of the main coil portion forming step #1, as illustrated in FIG. 15, between the wire turns of the main coil portion 41, gaps corresponding to the turns of the conductor wire 40 wound in the auxiliary coil portion 42 are formed. For example, when one turn of conductor wire 40 is wound in substantially gapless manner, a gap corresponding approximately to one conductor wire 40 will be formed between the conductor wire 40 turns constituting the main coil portion 41.

Figure 16:
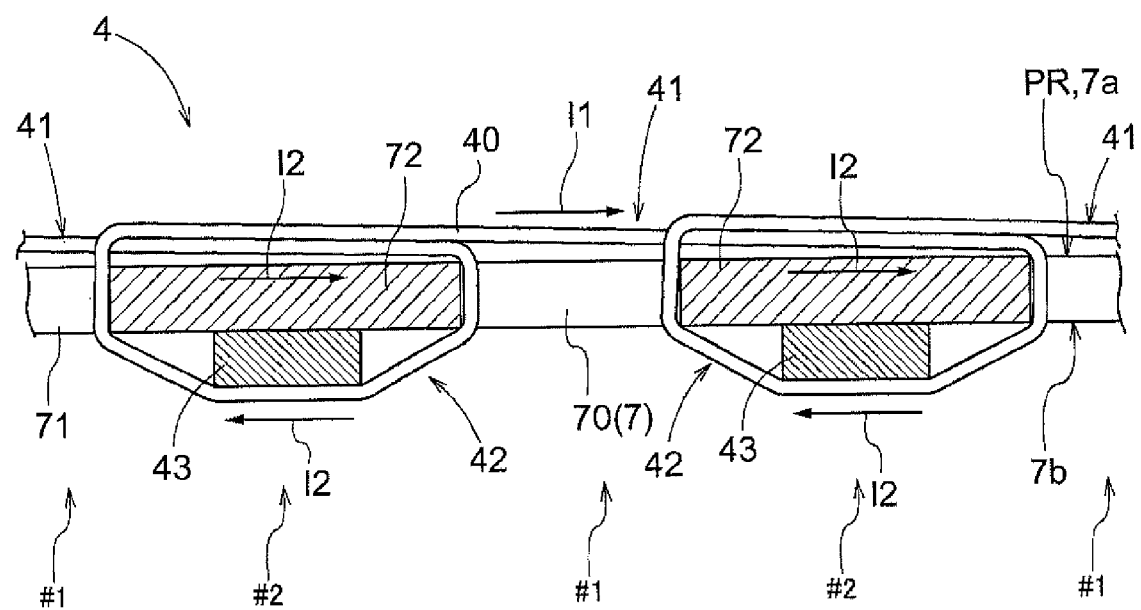
FIG. 16 is a view showing directions of currents flowing in the main coil portion and the auxiliary coil portion.

FIG. 16 is a view showing the conductor wire 40 used in effecting the main coil portion forming step #1 and the auxiliary coil portion forming step #2 as illustrated in FIG. 14 and FIG. 15, as seen in the axial direction of the second reference axis X2. As shown in this FIG. 16, of constituent components 12 of the current flowing in the auxiliary coil portion 42, the component parallel to the circumferential direction of the main coil portion 41 have the same direction as the current I1 flowing in the main coil portion 41 on the side proximate to this main coil portion 41. Therefore, in spite of the provision of the auxiliary coil portion 42 to the main coil portion 41, loss of magnetic field for use in the magnetic field resonance is restricted and reduction in transmission efficiency too will hardly occur.

Figure 17:
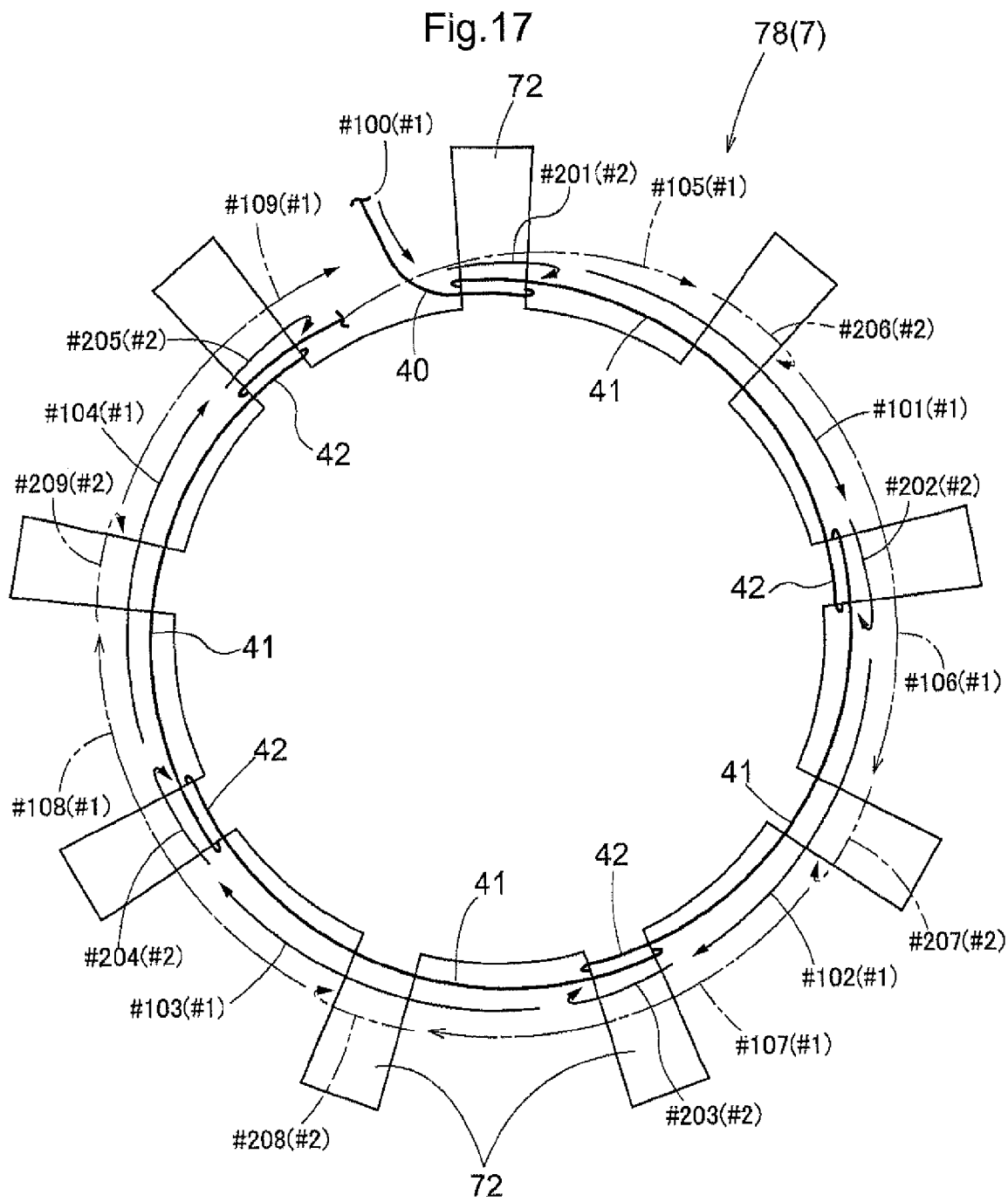
FIG. 17 is a view illustrating another example of winding the conductor wire.

Meanwhile, in the foregoing example explained above with reference to FIGS. 10-16, there was shown an example in which the antenna coil 4 having a rectangular-shaped main coil portion 41 is formed with using the rectangular core member 7. However, the shape of the main coil portion 41 is not limited to the rectangular shape, but can be a circular or a track shape as well. For instance, as shown in FIG. 17, with use of a circular core member 7, an antenna coil 4 having a circular main coil portion 41 can be easily formed. Further, in the foregoing example, there was shown a case in which an even number of second reference axes X2 are set in the circumferential direction of the main coil portion 41 (the direction of winding around the first reference axis X1). Needless to say, however, an odd number of second reference axes X2 can be set in the circumferential direction of the main coil portion 41. FIG. 17 shows an example in which an odd number (9 in this case) of axis portions 72 are provided in the core member 7.

Further, in the respective examples described above, there was illustrated an example using the plate-like substrate 70 as the core member 7 as shown in e.g. FIG. 12 and FIG. 17.

Figure 18:
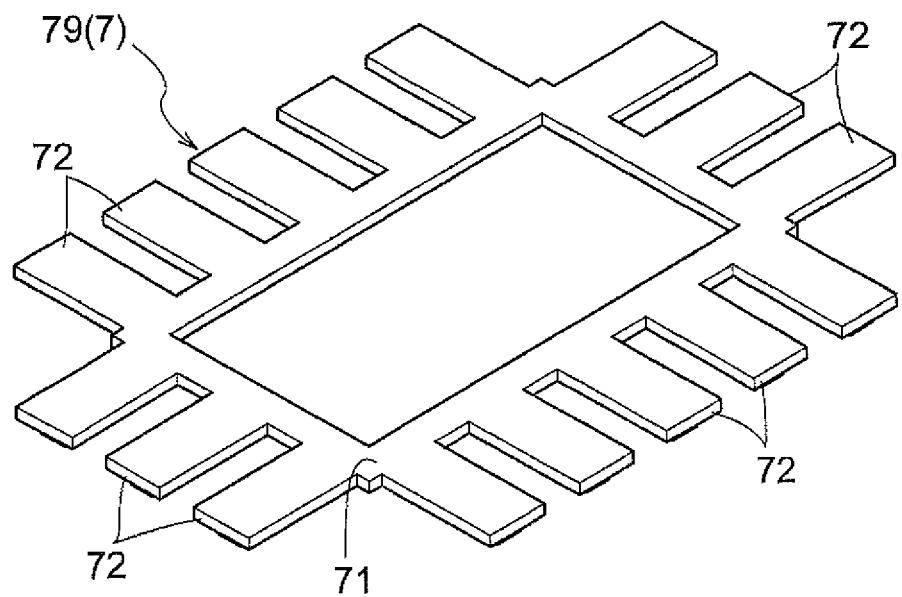
FIG. 18 is a view showing another example of substrate member.

However, the core member 7 is not limited to such substrate 70. As long as it has a plurality of axis portions 72 disposed along the respective second reference axes X2 and the connecting portion 71 interconnecting these multiple axis portions 72, the core member 7 can be an annular member 79 defining a through hole at the center of the connecting portion 71, as shown in FIG. 18 for example. Further, although this FIG. 18 shows a rectangular-shaped annular member 79 as the core member 7, the member 79 can also be a circular annular member, as a matter of course. Further, a plurality of through holes can be formed in distribution in the connecting portion 71 of the core member 7.

Figure 19:
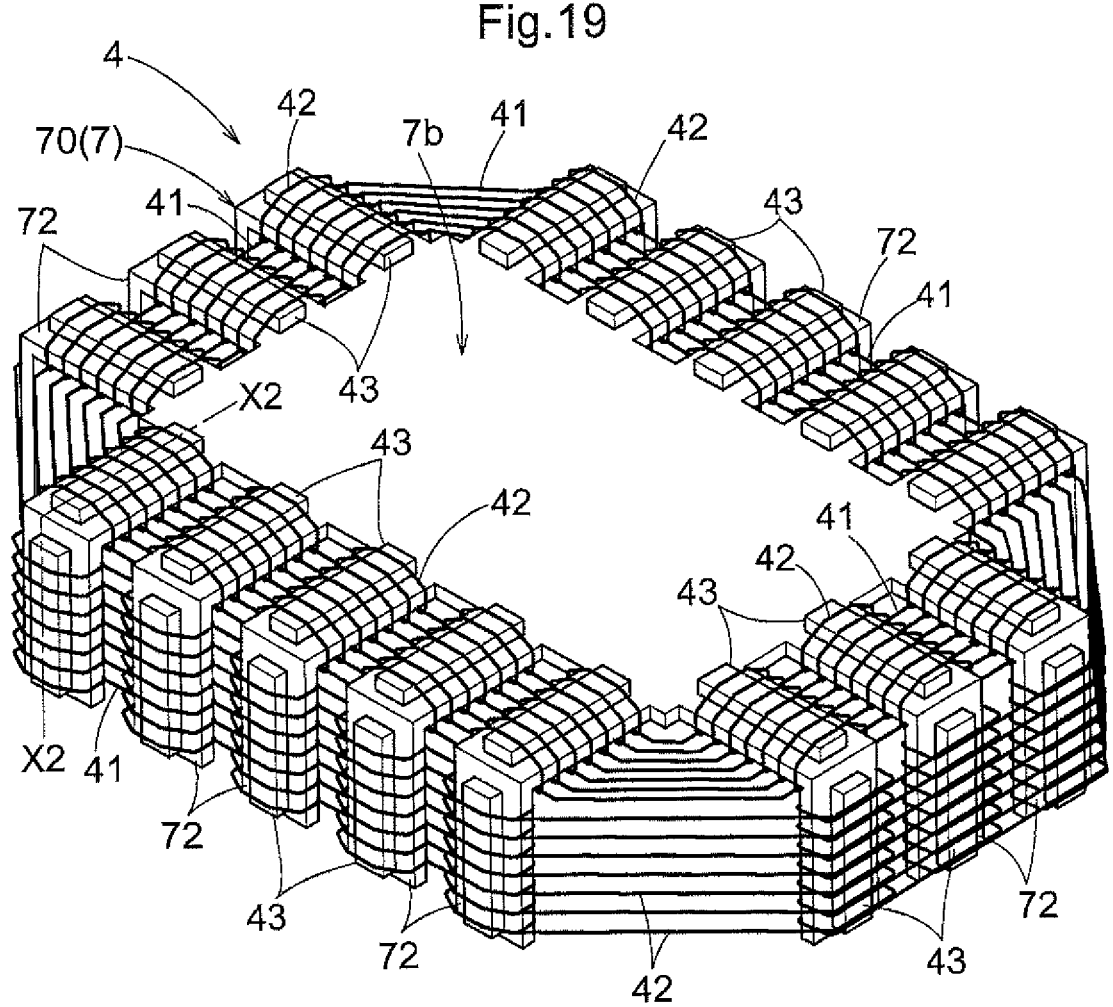
FIG. 19 is a perspective view showing another example of antenna coil.

Further, in the respective examples described above, there was shown a case where the auxiliary coil portions 42 are disposed along the back face side axial end face PB of the main coil portion 41 of the antenna coil 4. However, layout of the auxiliary coil portions 42 is not limited thereto. For instance, as shown in FIG. 19, the auxiliary coil portions 42 may be disposed such that some of them are disposed along the back face side axial end face PB and some are disposed along the first reference axis X1. In the case shown in FIG. 19, the second reference axis X2 of the auxiliary coil portion 42 is not a straight line, but a polygonal line (bent line) consisting of two straight lines and a bent portion between these straight lines. This bent portion need not have a right angle (or nearly right angle), but can have an acute angle or an obtuse angle, also. Alternatively, the second reference axis X2 need not be combination of straight lines, but can be a part of an arc or other curve. This aspect of the second reference axis X2 being not a straight line, but being combination of a plurality of straight lines or curves is applicable also to the second embodiment to be described later.

Figure 20:
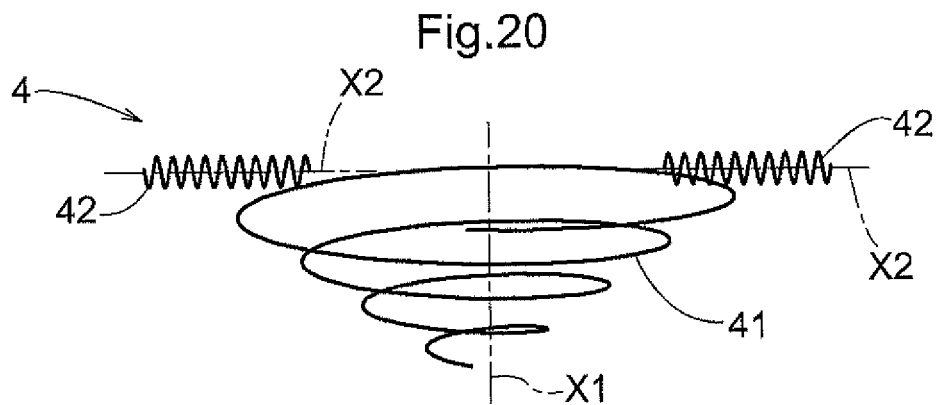
FIG. 20 is a view showing another configuration example of the main coil portion.
Figure 21:
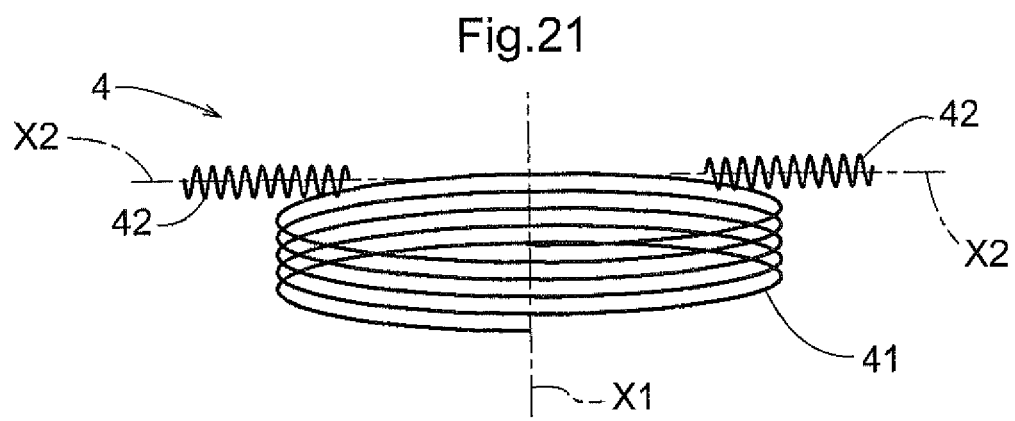
FIG. 21 is a view showing another configuration example of the main coil portion.

Further, in the respective examples described above, as shown in FIG. 7 for instance, there was shown a case where the main coil portion 41 is formed in a spiral form on/along the reference plane PR perpendicular to the first reference axis X1. However, the configuration of the first main portion 41 is not limited thereto. For instance, as shown in FIG. 20, the main coil portion 41 can be provided in a cylindrical form (tornado-like form) which is wound along a face parallel with the reference plane PR perpendicular to the first reference axis X2 and whose diameter progressively increases toward the back face side axial end face PB along the first reference axis X1. Further alternatively, as shown in FIG. 21 for instance, the main coil portion 41 can be provided in a cylindrical form (a form of coil-spring, i.e. spiral form) which is wound with a same diameter along the face parallel with the reference plane PR and which extends along the first reference axis X1. Incidentally, FIG. 10, FIG. 11, etc. show the antenna coil 4 having no magnetic core in the main coil portion 41. However, a core can be provided in the main coil portion 41.

Incidentally, the coil unit disclosed in Patent Document 1, as described also at paragraphs 90-92, etc. of this Patent Document 1, is capable of reducing in particular the electromagnetic field in a predetermined direction, not designed for forming a magnetic field having directivity to a predetermined direction. The antenna coil 4 of the present invention is not configured to suppress strength of magnetic field in a predetermined direction, but is provided with directivity to a predetermined direction and the presence/absence of the auxiliary coil portion 42 does not lead to significant reduction in the magnetic field strength. That is, it can be said that the characterizing feature of the present invention lies in provision of directivity without significant reduction in the magnetic field strength shown in FIG. 11 and FIG. 12 of Patent Document 1 and described at paragraphs 90-92, etc. in the same. With the presence of this characterizing feature, it becomes possible to provide contactless power supply in high efficiency, with effective suppression of leakage of magnetic flux into a space other than the space where the magnetic field coupling the power supplying side and power receiving side resonance circuits is formed. This is applicable not only to the first embodiment, but also to the configurations of the second embodiment and other embodiments which will be described later.

Also, in the case of the antenna coil disclosed in Patent Document 2, a loop coil is provided separately from the resonance coil acting as an antenna, and this loop coil is utilized as a shield. With this antenna coil, the resonance coil and the loop coil do not form a closed circuit together. Rather, the loop coil functions as a shield for passively providing directivity to the resonance coil. With reference to the description at paragraphs 54 and subsequent thereto in Patent Document 2 as well as to FIG. 3, etc. of this Patent Document 2, there is shown an arrangement in which loop forming or loop disconnecting of the loop coil are automatically controlled with use of an electronic switch. However, this arrangement only switches over whether this shield function is to be provided or not. Regarding the directivity, this is again only passive directivity, dependent on presence/absence of the shield. On the other hand, in the case of the present invention, as described above, the main coil portion 41 and the auxiliary coil portion 42 together form a closed circuit, so that a current flows simultaneously in the main coil portion 41 and the auxiliary coil portion 42. And, by the magnetic flux $\Phi 2$ generated in the auxiliary coil portion 42 when current flows therein, the magnetic flux $\Phi 1$ of the main coil portion 41 is deflected, thereby to provide directivity to the magnetic flux $\Phi 4$ of the antenna coil 4. Namely, the present invention is characterized in providing active directivity. This too is applicable not only to the first embodiment, but also to the configurations of the second embodiment and other embodiments which will be described later.

As described above, the antenna coil 4 relating to the first embodiment includes the main coil portion 41 formed by winding the conductive wire 40 around the first reference axis X1 and the auxiliary coil portion 42 formed by winding the conductive wire 40 around the second reference axis X2. And, as shown in FIGS. 14-16, etc., in this antenna coil 4, the main coil portion 41 and the auxiliary coil portion 42 are connected to each other to form a closed circuit. Further, as shown in FIGS. 5-7, etc., the second reference axis X2 is set so as to intersect the magnetic flux of the first coil portion 41 at the axial end of the auxiliary coil portion 42. And, the vector of the magnetic flux of the main coil portion 41 at the axial end P of the auxiliary coil portion 42 is deflected toward the direction along the second reference axis X2, in comparison with the vector of the magnetic flux of the main coil portion 41 at the virtual end Q set opposite the axial end P across the main coil portion 41.

For instance, as shown in FIG. 7, the vector of the magnetic flux of the man coil portion 41 at the axial end P of the auxiliary coil portion 42 is deflected in the direction along the second reference axis X2 as compared with the vector of the main coil portion 41 at the virtual end Q (virtual end point) which is the line symmetric position of the axial end P relative to the predetermined symmetry axis LS. Here, the symmetry axis LS is set as a straight line which is perpendicular to a set reference axis XP as an axis extending toward the side where the auxiliary coil portion 42 is provided relative to the main coil portion 41 and which also extends through the center of the main coil portion 41. The set reference axis XP can also be set as a line interconnecting the position of the center of the main coil portion 41 and the position of the center of the auxiliary coil portion 42. In case a plurality of main coil portions 41 and/or auxiliary coil portions 42 are provided, the center position of the plurality of coils becomes the center of the main coil portion 41 and the auxiliary coil portion 42. In the first embodiment, the set reference axis XP is in agreement with the first reference axis X1.

Second Embodiment

In the first embodiment described above, there was shown an example wherein the first reference axis X1 of the main coil portion 41 and the second reference axis X2 of the auxiliary coil portion 42 has an intersecting relationship. That is, in the first embodiment, there was explained an arrangement wherein the auxiliary coil portion 42 is provided to be able to adjust the directivity in the direction along the first reference axis X1 of the main coil portion 41. However, such adjustable directivity is not limited to the direction along the first reference axis X1, but can be a direction intersecting this first reference axis X1. Next, such configuration will be described as the second embodiment. Incidentally, regarding those portions overlapped with the first embodiment, explanation thereof will be omitted when appropriate.

Figure 22:
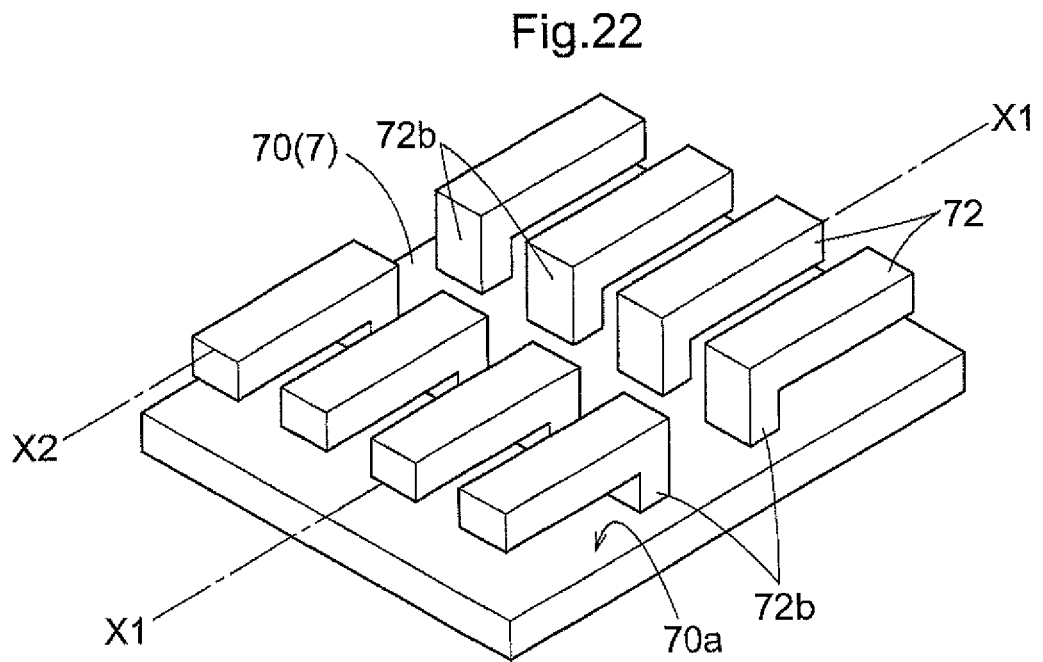
FIG. 22 is a schematic perspective view showing a substrate relating to a second embodiment.
Figure 23:
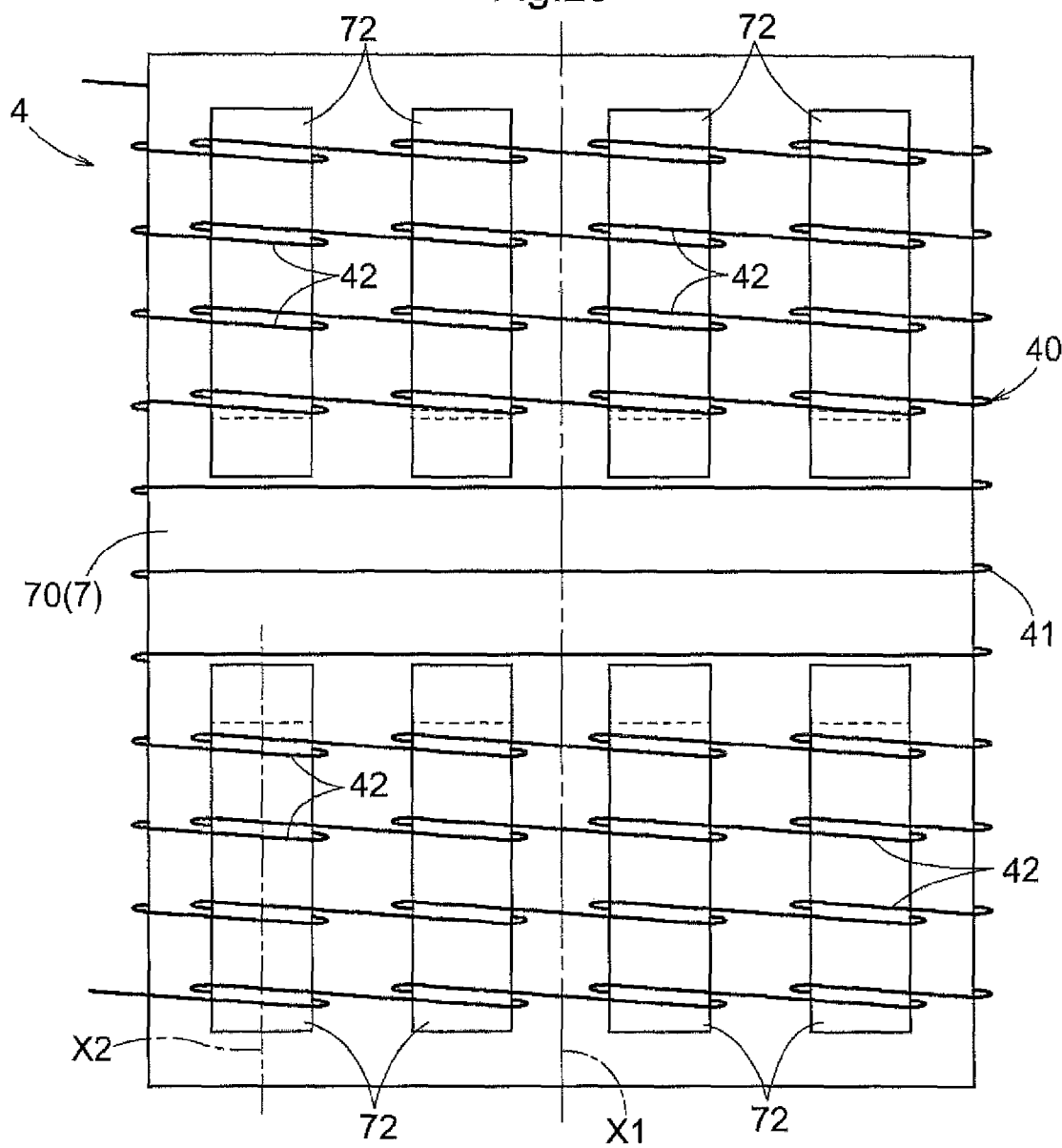
FIG. 23 is a schematic plan view showing one example of antenna coil relating to the second embodiment.

FIG. 22 schematically shows one example of the substrate 70 (core member 7) used for forming the main coil portion 41 and the auxiliary coil portion 42 in the second embodiment. As shown in FIG. 22, the first reference axis X1 of the main coil portion 41 is set along the substrate extending direction of the substrate 70, that is, along its face. As shown in FIG. 23, the main coil portion 41 is formed by winding a length of the conductor wire 40 around the substrate 70 as a core member to surround this substrate 70. On one substrate face 70a of the substrate 70, axis portions 72 are provided to extend in the direction perpendicular to the substrate face 70a to be away therefrom by a predetermined distance and then to extend along this substrate face 70a and the first reference axis X1. As the auxiliary coil portion 42 is disposed around the axis portion 72, the center axis of the axis portion 72 becomes the second reference axis X2. In the configuration shown in FIG. 22, at one terminal end of the axis portion 72 in the direction along the second reference axis X2, a support portion 27b is provided for supporting and fixing the axis portion 72 to the substrate face 70a. This support portion 72b delimits the set distance of the axis portion 72 relative to the substrate face 70a. Namely, the axis portion 72 is supported and fixed in a cantilever manner to the substrate face 70a. Needless to say, the invention is not limited to this configuration. Alternatively, the support portion 72b can be provided at the center portion of the axis portion 72 in the direction along the second reference axis X2 and the axis portion 72 can be supported and fixed by its center portion. Incidentally, in the example shown in FIG. 22, the first reference axis X1 and the second reference axis X2 extend parallel to each other. But, the second reference axis X2 need not be parallel to the first reference axis X1.

Figure 24:
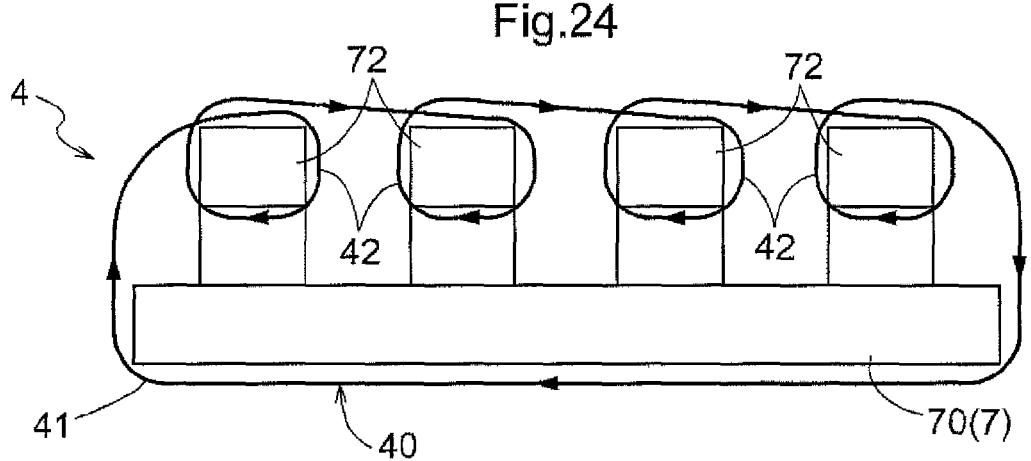
FIG. 24 is a schematic side view showing one example of antenna coil relating to the second embodiment.

FIG. 23 schematically shows the antenna coil 4 as seen from the side of the substrate face 70a shown in FIG. 22. Further, FIG. 24 schematically shows the antenna coil 4 as seen from the lateral face of the substrate 70. As shown in FIG. 23, the auxiliary coil portion 42 is formed by winding a length of the conductor wire 40 around the axis portion 72. Incidentally, though not shown, like the first embodiment, preferably, a magnetic core is provided in the axis portion 72. Also preferably, in this second embodiment too, like the first embodiment, as shown in FIG. 24, the auxiliary coil portion 42 is formed by winding the conductor wire 40 around the second reference axis X2 in the course of formation of the main coil portion 41 by winding the conductor wire 40 around the first reference axis X1.

Figure 25:
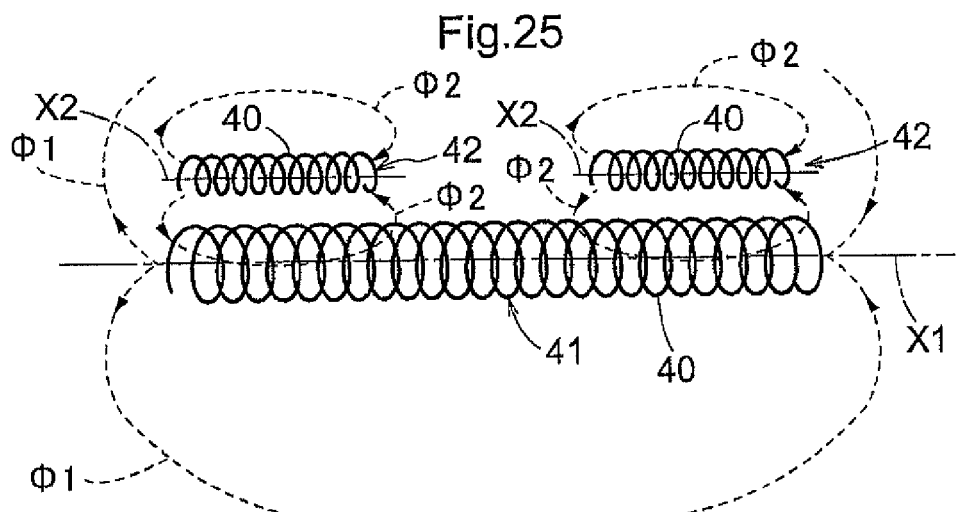
FIG. 25 is a diagram showing respective magnetic fields of the main coil portion and the auxiliary coil portion.

FIG. 25 shows a magnetic flux $\Phi 1$ generated by current flowing in the main coil portion 41 and a magnetic flux $\Phi 2$ generated by current flowing in the auxiliary coil portion 42. In this arrangement, no consideration is given to the relationship between the main coil portion 41 and the auxiliary coil portion 42. The magnetic flux $\Phi 1$ of the main coil portion 41 spreads radially in all directions perpendicular to the first axis X1 while passing through the main coil portion 41 along the first reference axis X1. The magnetic flux $\Phi 2$ of the auxiliary coil portion 42 spreads radially in all directions perpendicular to the second axis X2 while passing through the auxiliary coil portion 42 along the second axis X2 within the magnetic field generated by the main coil portion 41.

Figure 26:
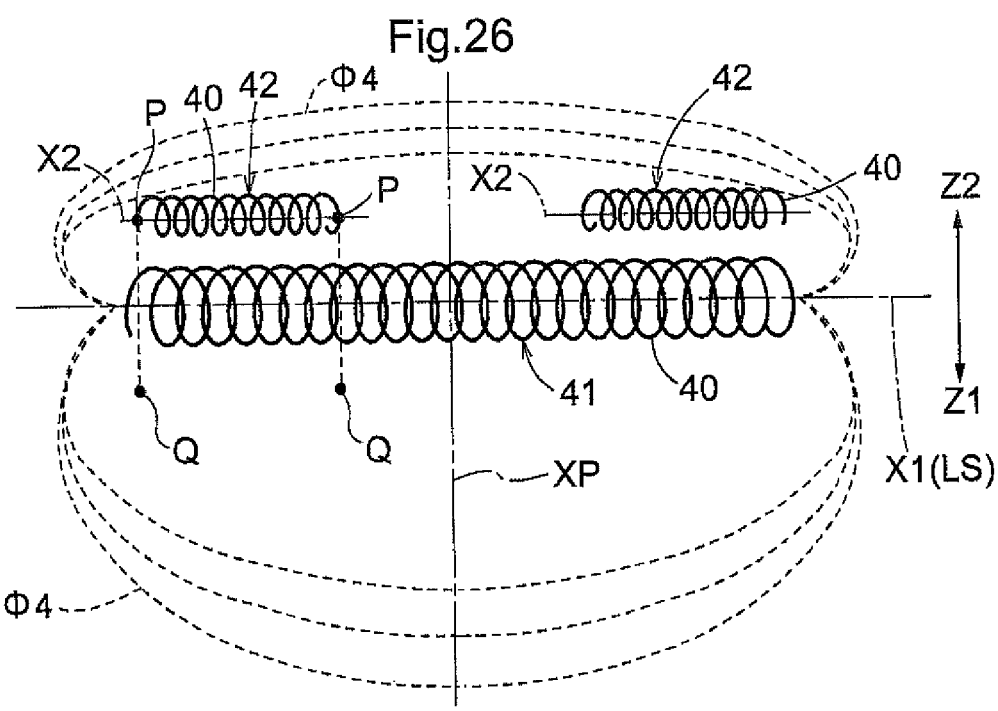
FIG. 26 is a diagram showing magnetic fields generated by current flowing in the antenna coil.

FIG. 26 shows an arrangement taking into consideration the mutual influence between the main coil portion 41 and the auxiliary coil portion 42, unlike the arrangement shown in FIG. 25. As shown in this FIG. 26, on the side where the auxiliary coil portion 42 is disposed, there will be formed an area where the direction of the magnetic flux $\Phi 1$ of the main coil portion 41 differs from the direction of the magnetic flux $\Phi 2$ of the auxiliary coil portion 42, an area where the direction of the magnetic flux $\Phi 1$ of the main coil portion 41 is substantially same as the direction of the magnetic flux $\Phi 2$ of the auxiliary coil portion 42. That is, by the magnetic flux $\Phi 2$ of the auxiliary coil portion 42, the magnetic flux $\Phi 1$ of the main coil portion 41 is canceled or enhanced, whereby the magnetic flux $\Phi 1$ of the main coil portion 41 is bent. In other words, on the side where the auxiliary coil portion 42 is disposed, the magnetic flux $\Phi 1$ of the main coil portion 41 is deflected to pass the side closer to the auxiliary coil portion 42 (on the side of the first reference axis X1 of the main coil portion 41). As a result, as shown in FIG. 26, in the direction perpendicular to the first reference axis X1, the magnetic flux $\Phi 1$ of the main coil portion 41 is provided with directivity toward the direction of "Z1" rather than "Z2".

As described above, the antenna coil 4 relating to the second embodiment includes the main coil portion 41 formed by winding the conductor wire 40 around the first reference axis X1 and the auxiliary coil portion 42 formed by winding the conductor wire 40 around the second reference axis X2. As shown in FIG. 23, FIG. 24, etc., in the antenna coil 4, the main coil portion 41 and the auxiliary coil portion 42 are connected to form a closed circuit. Further, as shown in FIG. 25 and FIG. 26, the second reference axis X2 is set to intersect the magnetic flux of the main coil portion 41 at the axial end of the auxiliary coil portion 42. And, vector of the magnetic flux of the main coil portion 41 at the axial end P of the second coil portion 42 is deflected in the direction along the second reference axis X2, relative to vector of the magnetic flux of the main coil portion 41 at the virtual end Q set opposite to the axial end P across the main coil portion 41.

For instance, as shown in FIG. 26, the vector of the magnetic flux of the main coil portion 41 at the axial end P of the auxiliary coil portion 42 is deflected in the direction along the second reference axis X2 as compared with the vector of the main coil portion 41 at the virtual end Q (virtual end point) which is the line symmetric position of the axial end P relative to the predetermined symmetry axis LS. Here, the symmetry axis LS is set as a straight line which is perpendicular to a set reference axis XP as an axis extending toward the side where the auxiliary coil portion 42 is provided relative to the main coil portion 41 and which also extends through the center of the main coil portion 41. The set reference axis XP can also be set as a line interconnecting the position of the center of the main coil portion 41 and the position of the center of the auxiliary coil portion 42. In case a plurality of the main coil portions 41 and/or the auxiliary coil portions 42 are provided, the center position of the plurality of coils becomes the center of the main coil portion 41 and the auxiliary coil portion 42. In the second embodiment, the set reference axis XP is in agreement with the first reference axis X1.

Figure 27:
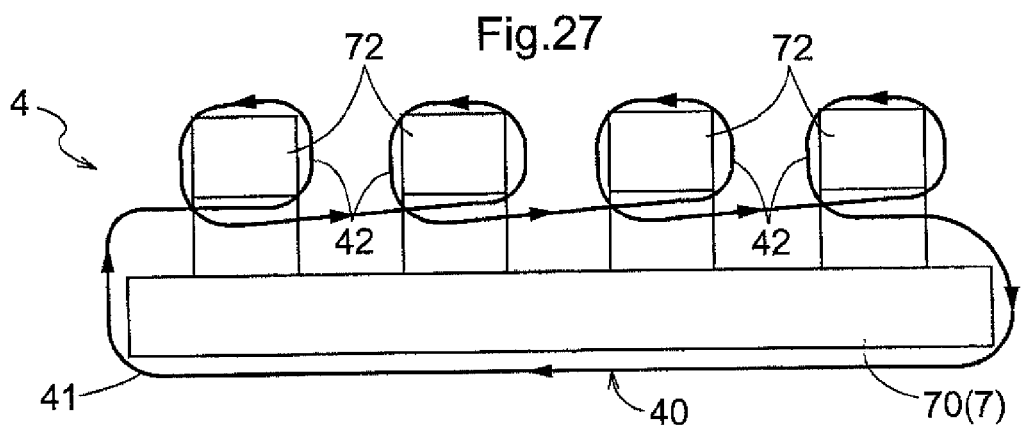
FIG. 27 is a schematic side view showing another example of antenna coil relating to the second embodiment.

FIG. 27 shows another case of forming the auxiliary coil portion 42 by winding the conductor wire 40 around the second reference axis X2 in the course of formation of the main coil portion 41 by winding the conductor wire 40 around the first reference axis X1. In the case of the example described above with reference to FIG. 24, there was explained a case of the so-called inscribed arrangement wherein the auxiliary coil portions 42 are disposed on the inner side (within the coil) of the main coil portion 41. FIG. 27, unlike the example shown in FIG. 24, shows an example of the so-called circumscribed arrangement wherein the auxiliary coil portions 42 are disposed on the outer side (outside the coil) of the main coil portion 41. The antenna coil 4 relating to the second embodiment can be the inscribed type shown in FIG. 24 or the circumscribed type shown in FIG. 27.

Incidentally, like the first embodiment, in order to effectively guide the magnetic flux generated by current flowing in the main coil portion 41, it is preferred that the auxiliary coil portion 42 be disposed in the vicinity of the main coil portion 41 in the radial direction of this main coil portion 41. As shown in FIG. 23, etc., preferably, the auxiliary coil portion 42 is disposed to have a portion thereof overlapped with the main coil portion 41 as seen in the direction perpendicular to the first reference axis X1.

Other Embodiments

Next, other embodiments of the present invention will be explained. The configurations of the respective embodiments to be described next are not limited to those used solely, but can be used in combination with configurations of other embodiment as long as such combination results in no contradiction.

(1) In the first embodiment described above, there was explained a case wherein the auxiliary coil portion forming step #2 is effected for all of the second reference axes X2 during winding of the conductor coil 40 around the first reference axis X1 at the main coil portion forming step #1. This applies also to the second embodiment, though illustration and detailed discussion thereof are omitted herein. Namely, in the respective embodiments described above, there was shown the example wherein the number of turns of the main coil portion 41 and the number of turns of the auxiliary coil portion 42 are same. However, the configuration of the antenna coil 4 is not limited thereto. Instead, the number of turns of the main coil portion 41 and the number of turns of the auxiliary coil portion 42 can be different from each other. In this case, in view of causing the two resonance circuits 5 to resonate via magnetic field, it is preferred that the number of turns of the main coil portion 41 be greater than the number of turns of the auxiliary coil portion 42.

According to one exemplary configuration, as shown in FIG. 17, for the second reference axes X2 disposed in the circumferential direction of the main coil portion 41, the auxiliary coil portion forming step #2 will be effected alternately (#100→#201→#101→ . . . #209→#109). With this mode of winding of the conductor wire 40, the number of turns of the main coil portion 41 can be made twice the number of turns of the auxiliary coil portion 42. This can be realized by winding the conductor wire 40 (#201→#209) for all the second reference axes X2 alternately during two turns winding (#100→#109) of the conductor wire 40 around the first reference axis X1.

(2) In the first embodiment and the second embodiment, there were shown the arrangements in which the antenna coils 4 each is comprised of one main coil portion 41 and a plurality of auxiliary coil portions 42. However, the invention is not limited thereto. The antenna coil 4 can be comprised of a plurality of main coil portions 41 and a single auxiliary coil portion 42. Needless to say, the antenna coil 4 can be comprised of a plurality of main coil portions 41 and a plurality of auxiliary coil portions 42. That is, it will suffice as long as the main coil portion(s) 41 and the auxiliary coil portion(s) 42 form a closed circuit. As illustrated above in the first embodiment and the second embodiment, as long as a portion of the conductor wire 40 forming the main coil portion 41 constitutes a portion of the auxiliary coil portion 42, the main coil portion 41 and the auxiliary coil portion 42 form a closed circuit. One skilled in the art could form the antenna coil 4 with using other wiring arrangement for forming a closed circuit by the main coil portion 41 and the auxiliary coil portion 42. Such other embodiments too are understood to belong in the technical scope of the present invention. For instance, by replacing the functions of the main coil portion 41 and the auxiliary coil portion 42 with setting of the relationship between the amounts of magnetic fluxes of the main coil portion 41 and the auxiliary coil portion 42 in reverse to that shown in the first embodiment and the second embodiment, an antenna coil 4 having a plurality of main coil portions 41 and one auxiliary coil portion 42 can be realized. Further, in the first embodiment and the second embodiment, there was shown the serial circuit with the auxiliary coil portion 42 being inserted in the midst of the main coil portion 41. However, electric connection relationship between the main coil portion 41 and the auxiliary coil portion 42 is not limited thereto. For instance, such other arrangements will be possible in which the auxiliary coil portions 42 are connected in series, outside the main coil portion 41 or in which the main coil portion 41 and the auxiliary coil portion 42 are connected parallel to each other.

(3) In the foregoing embodiments, there were shown the configurations of wire-less power supply to a power storage device mounted on the vehicle 9. Needless to say, the application of the present invention is not limited to vehicles. For example, the present invention is applicable to electric power transmission for transmitting power generated by a small hydroelectric power generation or solar power generation, a small wind power generation to a general household or building, that is, power transmission for use in the smart-grid system.

INDUSTRIAL APPLICABILITY

The present invention can be used in an antenna coil for use in wireless power supply of magnetic resonance type. The invention can be used also in an antenna coil employed for any other type of wireless transmission.

SIGNS LISTS $\Phi 1$: magnetic flux of main coil portion
$\Phi 4$: magnetic flux of antenna coil
4: antenna coil
40: conductor wire
41: main coil portion
42: auxiliary coil portion
43: auxiliary coil core LS: symmetry axis
P: axial end of auxiliary coil portion
Q: virtual end
X1: first reference axis
X2: second reference axis
XP: set reference axis

The invention claimed is:

1. An antenna coil, comprising:
a main coil portion formed by winding a length of conductor wire around a first reference axis; and
an auxiliary coil portion formed by winding a length of conductor wire around a second reference axis different from the first reference axis, the auxiliary coil portion having a smaller diameter than a diameter of the main coil portion, the auxiliary coil portion being disposed such that a magnetic flux of the main coil portion is deflected in a direction along the second reference axis;
wherein the main coil portion and the auxiliary coil portion are connected in series or in parallel to form a closed circuit, and wherein when current flows simultaneously in the main coil portion and the auxiliary coil portion, the magnetic flux of the main coil portion has directivity such that the magnetic flux of the main coil portion spreads on a side where the auxiliary coil portion is absent relative to a side where the auxiliary coil portion is present and the magnetic flux of the main coil portion bends and returns via the auxiliary coil portion as a bypassing circuit.

2. The antenna coil according to claim 1, wherein an inductance of the auxiliary coil portion is set smaller than an inductance of the main coil portion.

3. The antenna coil according to claim 1, wherein the auxiliary coil portion is formed by winding a length of conductor wire around an auxiliary coil core formed of magnetic material and disposed along the second reference axis.

4. The antenna coil according to claim 1, wherein the auxiliary coil portion is disposed such that a component of a current flowing in the auxiliary coil portion parallel with a tangent of conductor wire of the main coil portion wound around the first reference axis has a same direction as a current flowing in the main coil portion on a side proximate to the main coil portion.

5. The antenna coil according to claim 1, wherein the auxiliary coil portion is disposed such that the second reference axis is directed along one axial end face which is perpendicular to the first reference axis at one end of the main coil portion in a direction along the first reference axis.

6. The antenna coil according to claim 5, wherein when the antenna coil is provided in at least one of a power supplying circuit and a power receiving circuit of a magnetic-field resonance power supplying apparatus for effecting wireless power supply and transferring power to or from the antenna coil and another antenna coil, the auxiliary coil portion is disposed along a back face side axial end face which is an axial end face opposite to a side opposed to the other antenna coil.

7. The antenna coil according to claim 1, wherein a plurality of the auxiliary coil portions are provided, and the plurality of the auxiliary coil portions are disposed along a plane perpendicular to the first reference axis and equidistantly along a circumferential direction with the first reference axis as a center.

8. The antenna coil according to claim 1, wherein the auxiliary coil portion is disposed in such a manner as to have a portion thereof overlapped with the main coil portion as seen along an axial direction of the first reference axis.

9. The antenna coil according to claim 1, wherein the main coil portion is formed in a shape of a planar spiral coil in a reference plane perpendicular to the first reference axis.

10. The antenna coil according to claim 1, wherein the main coil portion and the auxiliary coil portion are connected in series to form a closed circuit.

11. The antenna coil according to claim 1, wherein a plurality of the auxiliary coil portions are provided, and a sum of inductances of the auxiliary coil portions is set smaller than an inductance of the main coil portion.

12. The antenna coil according to claim 1, wherein a plurality of the main coil portions and a plurality of the auxiliary coil portions are provided, and a sum of inductances of the auxiliary coil portions is set smaller than a sum of inductances of the main coil portions.

13. The antenna coil according to claim 1, wherein a plurality of the main coil portions are provided, and an inductance of the auxiliary coil portion is set smaller than a sum of inductances of the main coil portions.

14. An antenna coil which is at least one of a power supplying side coil and a power receiving side coil of a magnetic-field resonance power supply apparatus for effecting wireless power supply between a power supplying circuit having the power supplying side coil and a power receiving circuit having the power receiving side coil, the antenna coil comprising:
a main coil portion formed by winding a length of conductor wire around a first reference axis; and
an auxiliary coil portion formed by winding a length of conductor wire around a second reference axis different from the first reference axis, the auxiliary coil portion having a smaller diameter than a diameter of the main coil portion;
an opposing side axial end face of the antenna coil that is an end face perpendicular to the first reference axis at a first end of the main coil portion on a side where the power supplying side coil and the power receiving side coil are opposed to each other; and
a back face side axial end face that is an end face perpendicular to the first reference axis at a second end of the main coil portion and is opposite the opposing side axial end face;
wherein the main coil portion and the auxiliary coil portion are connected in series or in parallel to form a closed circuit,
the auxiliary coil portion is disposed along the back face side axial end face with a depression angle of within 45 degrees for progressive inclination from the back face side axial end face toward the opposing side axial end face as the auxiliary coil portion extends toward a radial outer side of the main coil portion, and
a magnetic flux of the main coil portion is deflected in a direction along the second reference axis, and wherein when current flows simultaneously in the main coil portion and the auxiliary coil portion, the magnetic flux of the main coil portion has directivity in a direction along the first reference axis such that the magnetic flux of the main coil portion spreads on a side where the auxiliary coil portion is absent relative to a side where the auxiliary coil portion is present and the magnetic flux of the main coil portion bends and returns via the auxiliary coil portion as a bypassing circuit.

15. The antenna coil according to claim 14, wherein a plurality of the auxiliary coil portions are provided, and a plurality of the auxiliary coil portions are disposed equidistantly along a circumferential direction with the first reference axis as a center.

16. The antenna coil according to claim 15, wherein each of the auxiliary coil portions is disposed in such a manner as to have at least a portion thereof overlapped with the main coil portion as seen along an axial direction of the first reference axis.

17. The antenna coil according to claim 16, wherein a sum of inductances of the auxiliary coil portions is set smaller than an inductance of the main coil portion.

18. The antenna coil according to claim 17, wherein the main coil portion is formed in a shape of a planar spiral coil in a reference plane perpendicular to the first reference axis.

19. An antenna coil which is at least one of a power supplying side coil and a power receiving side coil of a magnetic-field resonance power supply apparatus for effecting wireless power supply between a power supplying circuit having the power supplying side coil and a power receiving circuit having the power receiving side coil, the antenna coil comprising:

a main coil portion formed by winding a length of conductor wire around a first reference axis; and an auxiliary coil portion formed by winding a length of conductor wire around a second reference axis different from the first reference axis, the auxiliary coil portion having a smaller diameter than a diameter of the main coil portion, the second reference axis being substantially in parallel with the first reference axis, wherein the main coil portion and the auxiliary coil portion are connected in series or in parallel to form a closed circuit, the auxiliary coil portion is inscribed in the main coil portion on a side where the power supplying side coil and the power receiving side coil are opposed to each other, or circumscribed on the main coil portion on a side where the power supplying side coil and the power receiving side coil are opposed to each other, and is disposed in such a manner as to have a portion thereof overlapped with the main coil portion as seen along a first direction perpendicular to the first reference axis, and a magnetic flux of the main coil portion is deflected in a direction along the second reference axis, and wherein when current flows simultaneously in the main coil portion and the auxiliary coil portion, the magnetic flux of the main coil portion has directivity in a second direction perpendicular to the first reference axis such that the magnetic flux of the main coil portion spreads on a side where the auxiliary coil portion is absent relative to a side where the auxiliary coil portion is present and the magnetic flux of the main coil portion bends and returns via the auxiliary coil portion as a bypassing circuit.

20. The antenna coil according to claim 19, wherein a plurality of the auxiliary coil portions are provided, and a sum of inductances of the auxiliary coil portions is set smaller than an inductance of the main coil portion.

* * * * *